(12) United States Patent
Mannheimer et al.

(10) Patent No.: US 12,411,665 B1
(45) Date of Patent: Sep. 9, 2025

(54) USER INTERFACE FOR MACHINE LEARNING MODEL GENERATION

(71) Applicant: Tableau Software, LLC, Seattle, WA (US)

(72) Inventors: Nathan Robert Mannheimer, Seattle, WA (US); Jun Ho Kim, Sammamish, WA (US); Bryan Alexander Feddern, Seattle, WA (US); Allison Anne Whilden, Redmond, WA (US); Nicholas Adam Hritsko, Monroe, WA (US); Robert Howard Brill, Jr., San Francisco, CA (US); Zoltan Foley-Fisher, Campbell, CA (US); Jan Michael Timmerman, Guelph (CA); Alethea Scattergood Bair-Sutherland, Belmont, CA (US); Anamaria Crisan, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/521,820

(22) Filed: Nov. 8, 2021

Related U.S. Application Data

(60) Provisional application No. 63/242,012, filed on Sep. 8, 2021.

(51) Int. Cl.
*G06F 8/34* (2018.01)
*G06F 3/0482* (2013.01)
*G06F 8/60* (2018.01)

(52) U.S. Cl.
CPC .............. *G06F 8/34* (2013.01); *G06F 3/0482* (2013.01); *G06F 8/60* (2013.01); *G06F 2203/04803* (2013.01)

(58) Field of Classification Search
CPC . G06F 8/34; G06F 3/0482; G06F 8/60; G06F 2203/04803
See application file for complete search history.

(56) References Cited

U.S. PATENT DOCUMENTS

| | | | |
|---|---|---|---|
| 10,885,452 B1 * | 1/2021 | Garg | G06N 7/01 |
| 2014/0040871 A1 * | 2/2014 | Schwan | G06F 11/3664 717/141 |

(Continued)

OTHER PUBLICATIONS (SAP, "Automated Analytics User Guides and Scenarios", Aug. 28, 2020) (Year: 2020).*

(Continued)

*Primary Examiner* — Noor Alkhateeb
(74) *Attorney, Agent, or Firm* — Morgan, Lewis & Bockius LLP

(57) ABSTRACT

A computing device displays, in a user interface, a workflow that includes a plurality of steps. In response to user selection of a first step of the plurality of steps, the computing device displays a list of data sources. The device receives user selection of a first data source of the data sources. The device receives user input specifying a target data field from the first data source and a modeling objective for the target data field. In response to the user input, the device automatically executes a model to predict a first outcome for the target data field based on the modeling objective. The device displays results of the model. The device receives user input to deploy the model. In accordance with the user input, the device deploys the model.

20 Claims, 37 Drawing Sheets

(56) References Cited

U.S. PATENT DOCUMENTS

| | | | | |
|---|---|---|---|---|
| 2016/0232537 | A1* | 8/2016 | Nonez | G06F 16/24578 |
| 2018/0052898 | A1* | 2/2018 | Allan | G06F 16/2358 |
| 2019/0236514 | A1* | 8/2019 | Schubert | G06F 9/451 |
| 2019/0347282 | A1* | 11/2019 | Cai | G06N 5/022 |
| 2020/0134641 | A1* | 4/2020 | Morgan | G06F 3/04817 |
| 2020/0134683 | A1* | 4/2020 | Boren | G06F 16/904 |
| 2020/0174755 | A1* | 6/2020 | Rose | G06F 8/35 |
| 2020/0380432 | A1* | 12/2020 | Wang | G06F 3/04817 |
| 2021/0232920 | A1* | 7/2021 | Parangi | G06F 16/2457 |
| 2021/0319034 | A1* | 10/2021 | Bern | G06F 16/9538 |
| 2021/0406325 | A1* | 12/2021 | Sinn | G06F 16/9535 |
| 2021/0406369 | A1* | 12/2021 | Healy | G06F 21/562 |
| 2022/0050695 | A1* | 2/2022 | Gajendran | G06N 20/00 |
| 2022/0245511 | A1* | 8/2022 | Perian | G06N 5/04 |
| 2022/0309391 | A1* | 9/2022 | Patel | G06F 16/906 |
| 2022/0358286 | A1* | 11/2022 | Wilson-Thomas | G06F 40/284 |

OTHER PUBLICATIONS (Clairvoyant, "No-code Machine Learning Model With Azure ML Designer", Aparna Kesarkar, Aug. 27, 2021) (Year: 2021).*

* cited by examiner

USER INTERFACE FOR MACHINE LEARNING MODEL GENERATION

RELATED APPLICATIONS

This application claims priority to U.S. Provisional Patent Application No. 63/242,012, filed Sep. 8, 2021, entitled "Visual Tracing and Editing of Machine Learning Models," which is hereby incorporated by reference herein in its entirety.

This application is related to "Introduction to Einstein Discovery," available at https://help.salesforce.com/s/articleView?id=sf.bi_edd_about.htm&type=5, which is hereby incorporated by reference herein in its entirety.

TECHNICAL FIELD

The disclosed implementations relate generally to data visualization and more specifically to systems, methods, and user interfaces for interactive visual analysis of a data set.

BACKGROUND

Data visualization applications enable a user to understand a data set visually. Visual analyses of data sets, including distribution, trends, outliers, and other factors are important to making business decisions. Some data sets are very large or complex, and include many data fields. Some data elements are computed based on data from a selected data set. Various tools can be used to help understand and analyze the data, including dashboards that have multiple data visualizations and natural language interfaces that help with visual analytical tasks.

Today, adding predictions from machine learning (ML) models to a data visualization application requires users to build custom ML models outside of the data visualization application using custom ML applications or other tools. This creates a disjointed, multi-product experience and requires users to learn and leverage different product user interfaces. This disjointed experience also siloes predictive model builders (e.g., data analysts) away from the teams that need predictions to make decisions. The segregation between data analysts and the teams leads to slow delivery of results, introduces errors due to misunderstood requirements, and can render even successful predictive models irrelevant as the world changes.

SUMMARY

There is a need for improved systems and methods that support interactions with data visualization (e.g., visual analytics) systems. The present disclosure describes systems, user interfaces, methods, and devices that integrate (e.g., combine) visual analytics with predictive analytics. For example, data that was previously generated using a data visualization application can be augmented with statistical modeling and machine learning (ML), and turned into predictive ML models that can identify, surface, and visualize insights into the data. The models and predictions can be presented in a manner that is easily understood and visualized by users. Users can evaluate the performance of a trained ML model, understand what variables have the greatest impact on a modeling objective, and determine how robust the model is likely to be on future data it has yet to see. If a model meets the user's expectations, the user can deploy the model and make the model available to other users across their organization to generate predictions. Once deployed, anyone with access to the modeling project can track the model's performance and utilization over time.

The present disclosure describes systems and user interfaces that enable data scientists/analysts (also known as "Business Scientists") to collaborate with other members within an organization (who may not have a data science background) to train, understand, evaluate, and operationalize no-code predictive ML models. For example, instead of extracting data away from the business domain to start modeling, a business scientist can create a modeling project that includes all relevant stakeholders. Together, these team members can clarify business questions and identify relevant data that, with a series of click-through steps, can fit an ML model to generate predictions to improve decisions. Collaborators can use visualizations to understand the effectiveness of the model, review potential bias problems, and explore how features drive predictions. Thus, by democratizing access to predictive analytics, organizations are empowered to accelerate and improve decisions. Today, these are missed opportunities due to the limited bandwidth of centralized data science teams. Augmenting existing analyses with predictions built close to the business delivers faster, more complete analytics supporting quicker, more accurate decisions.

In some implementations of the present disclosure, once a trained model is deployed, the modeling project exists in a data catalog, thereby providing an auditable trail for all data and modeling choices. Business scientists can monitor and improve the model's performance. They can also identify new problems to be solved. The disclosed ML models can integrate predictions into data visualization dashboards, worksheets, and data prep workflows in accordance with some implementations.

In accordance with some implementations, a method generates predictive analytics based on no-code machine learning (ML) models. The method is performed at a computing device that includes a display, one or more processors, and memory. The memory stores one or more programs configured for execution by the one or more processors. The method includes displaying, in a user interface, a workflow that includes a plurality of steps. The method is responsive to user selection of a first step of the plurality of steps, displaying a list of data sources. The method receives user selection of a first data source of the data sources. The method then receives user input specifying a target data field from the first data source and a modeling objective for the target data field. In response to the user input, the method automatically executes a model to predict a first outcome for the target data field based on the modeling objective and displays results of the model. The method also receives user input to deploy the model. The method then deploys the model.

In some implementations, each of the steps of the workflow is a user-selectable element in the user interface.

In some implementations, the first step corresponds to a first user-selectable element. The method further comprises, in response to user selection of the first element, displaying the first element in a visually distinct manner from other elements corresponding to other steps in the workflow.

In some implementations, after receiving the user input specifying the target data field and the modeling objective, the method updates the first element to indicate completion of the first step.

In some implementations, in response to the user input specifying the target data field, the method determines one or more second data fields from the data source and a respective correlation between the target data field and each of the one or more second data fields. The method displays the respective correlations as a ranked bar chart in the user interface.

In some implementations, the results of the model are displayed on a side pane of the user interface.

In some implementations, displaying the results of the model includes displaying one or more of: a model title, a date of generation of the model, a date of update of the model, and a version of the model.

In some implementations, displaying the results of the model includes displaying a plurality of metrics of the model.

In some implementations, the method further comprises receiving user selection of a first metric of the plurality of metrics. In response to the user selection, the method displays a plurality of navigation tabs in the user interface. User selection of a respective tab causes respective information about the first metric to be displayed.

In some implementations, the method further comprises displaying a progress bar for visualizing progress of the model execution.

In some implementations, the method further comprises receiving user specification of a plurality of users to which the model is to be deployed.

In some implementations, the user selection of the first step initiates a predictive modeling project. The method further comprises storing all artifacts of the predictive modeling project on the computing device.

In some implementations, the method further comprises receiving user modification of a first artifact of the artifacts. The method also comprises, in accordance with the user modification, automatically executing the model to predict an updated outcome for the target data field based on the modeling objective and the first artifact.

In some implementations, deploying the model comprises sending the model to a plurality of users via a plurality of modes of communication.

In some implementations, a computing device includes a display, one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily integrate predictions from machine learning (ML) models with data visualizations.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The disclosed implementations integrate (e.g., combine) a ML platform with a visual analytics platform (e.g., data visualization application) to create a new collaborative experience around how to discover, transform, visualize, iterate, and publish new models on their data.

The disclosed methods, systems, and user interfaces allow teams to collaboratively translate data (e.g., data sources that reside on the visual analytics platform) and their domain knowledge into better decisions augmented by leading-edge ML models.

In some implementations, business scientists initiate a collaborative experience by creating a modeling project built around a simple flow-based user interface (UI) and inviting team members to discuss the problem and share input throughout the process. The team can choose existing data sources from the visual analytics platform (e.g., Tableau) or use data preparation web authoring to prepare training data for the project. Users (e.g., team members) can then discuss and describe their business question by selecting a data field and an objective (e.g., whether they want to increase it (e.g., sales, profit, conversions) or decrease it (e.g., churn, defects)). In some implementations, data is automatically transmitted to the ML platform, to fit an optimal model to the user's business requirements.

In some implementations, the ML platform augments the modeling process by visually surfacing statistically significant patterns, which can be shared as Tableau workbooks. Teams use these insights to explore the model and rapidly iterate to improve accuracy. Throughout the process, a user experience centered on model interpretability and automated bias detection helps collaborators understand model results and potential pitfalls in plain business language.

In some implementations, after determining a model is safe and useful, users can publish it to start generating predictions. Predictions can be consumed in data and visualizations, tracked for performance and data drift, and integrated into the data catalog all inside Tableau.

Figure 1:
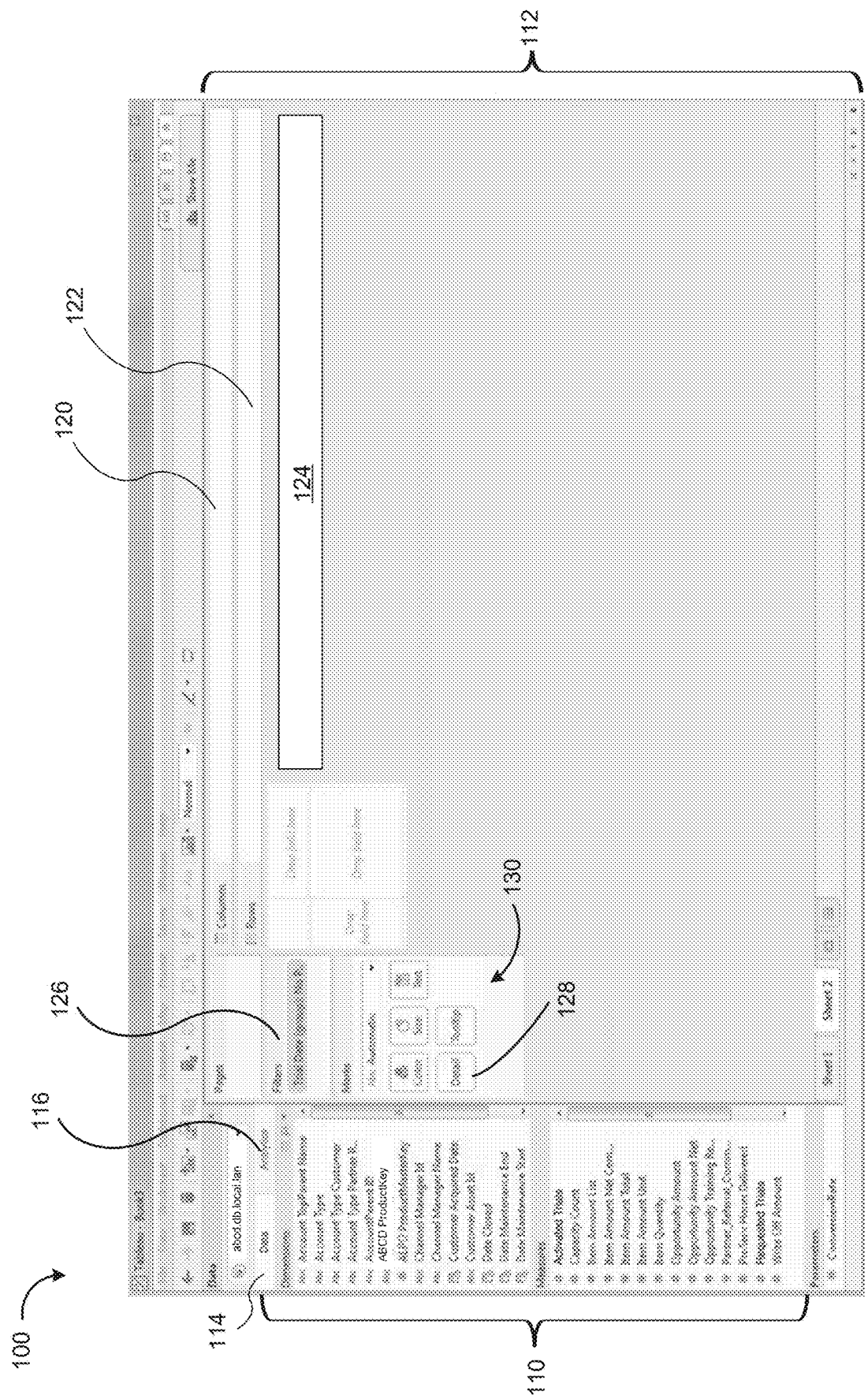
FIG. 1 shows a graphical user interface used in some implementations.

In some implementations, the users of an integrated predictive and visual analytics platform include:
  Data analysts/advanced business users who can navigate through data insights and model metrics;
  Business users who will be consuming the outputs of the predictive models and validating that the results of the predictions are providing the level of value for their business that they expected;

Operations teams who understand how the business functions;

IT teams who might need to help wrangle additional data or be required to maintain the models; and/or Data scientists who can collaborate and provide guidance on modeling projects to ensure things like auditing, assumptions, and modeling decisions are accurate FIG. 1 shows a graphical user interface 100 for interactive data analysis according to some implementations. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the shelf regions determine characteristics of a desired data visualization. For example, a user can place field names into these shelf regions (e.g., by dragging fields from the schema information region 110 to the column shelf 120 and/or the row shelf 122), and the field names define the data visualization characteristics. A user may choose a vertical bar chart, with a column for each distinct value of a field placed in the column shelf region. The height of each bar is defined by another field placed into the row shelf region.

In some implementations, the graphical user interface 100 includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

In some implementations, the graphical user interface 100 includes a view level detail icon 128, which can be used to specify or modify the level of detail for the data visualization. The view level detail icon 128 enables a user to specify a level of detail that applies to the data visualization overall or to specify additional fields that will be included in the overall level of detail (in addition to those that are included by default). Typically, implementations have only one "overall" level of detail. Other levels of detail may be specified within individual contexts, as described below.

In some implementations, the graphical user interface 100 includes an encodings region 130 to specify various encodings for a data visualization.

Figure 2:
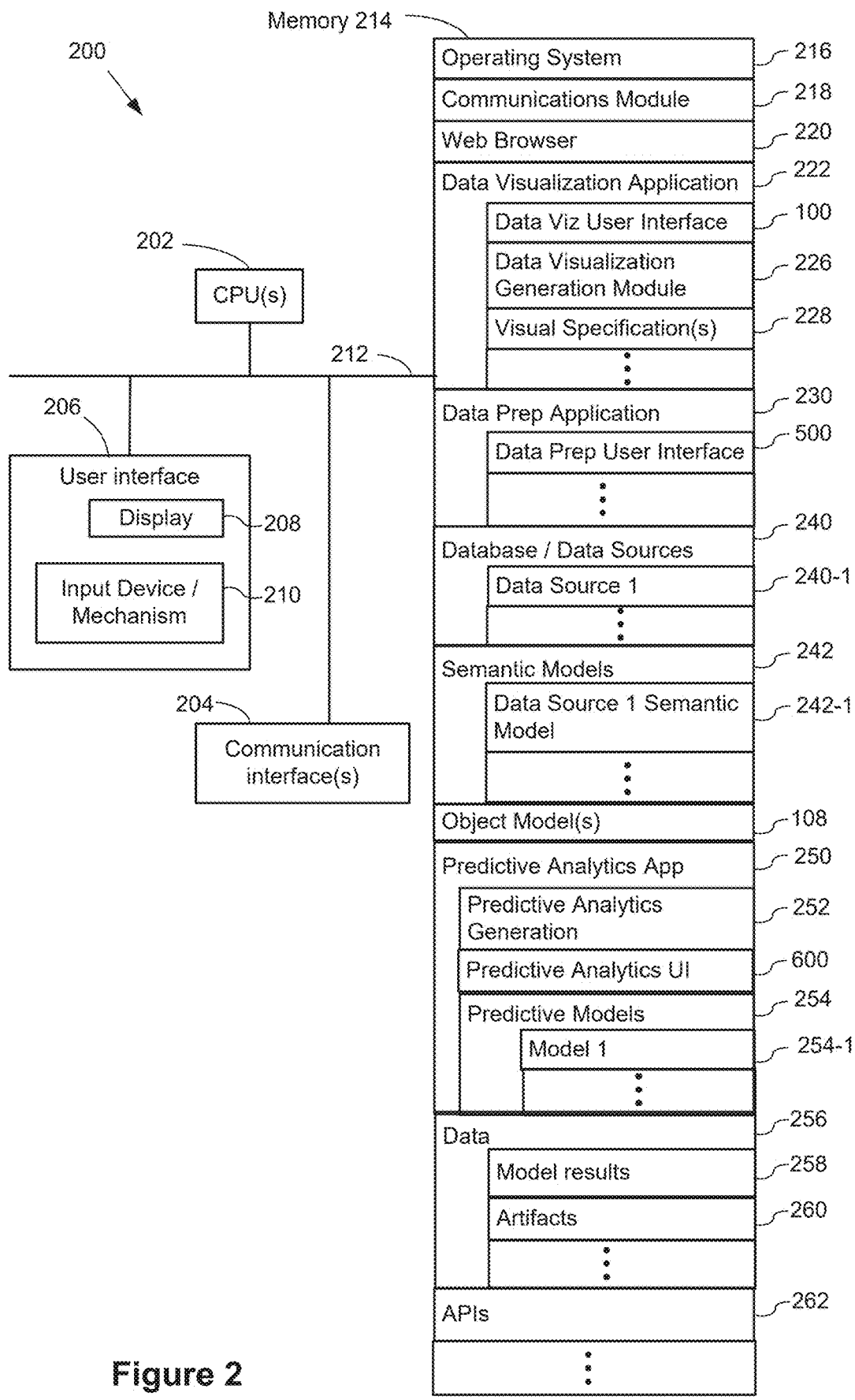
FIG. 2 is a block diagram of a computing device according to some implementations.

FIG. 2 is a block diagram illustrating a computing device 200 that can display the graphical user interface 100 or the predictive analytics UI 600 in accordance with some implementations. The computing device can also be used by a data preparation ("data prep") application 230 or a predictive analytics application 250. Various examples of the computing device 200 include a desktop computer, a laptop computer, a tablet computer, and other computing devices that have a display and a processor capable of running a data visualization application 222, a data prep application 230, and/or a predictive analytics application 250. The computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

an operating system 216, which includes procedures for handling various basic system services and for performing hardware dependent tasks;

a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;

a web browser 220 (or other application capable of displaying web pages), which enables a user to communicate over a network with remote computers or devices;

a data visualization application 222, which provides a graphical user interface 100 for a user to construct visual graphics. For example, a user selects one or more data sources 240 (which may be stored on the computing device 200 or stored remotely, such as on a server system 300), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server;

zero or more databases or data sources 240 (e.g., a first data source 240-1), which are used by the data visualization application 222. In some implementations, the data sources are stored as spreadsheet files, CSV files, XML files, or flat files, or stored in a relational database;

zero or more semantic models 242 (e.g., a first semantic model 242-1), each of which is derived directly from a respective database or data source 240. A semantic model 242 represents the database schema and contains metadata about attributes. In some implementations, a semantic model 242 also includes metadata of alternative labels or synonyms of the attributes. A semantic model 242 includes data types (e.g., "text," "date," "geospatial," "Boolean," and "numeric"), attributes, (e.g., a currency type such as the United States Dollar), and a semantic role or a data role (e.g., "City" role for a geospatial attribute) for data fields of the respective database or data source 240. In some implementations, a semantic model 242 also captures statistical values (e.g., data distribution, range limits, average, and cardinality) for each attribute. In some implementations, a semantic model 242 is augmented with a grammar lexicon that contains a set of analytical concepts found in many query languages (e.g., average, filter, and sort). In some implementations, a semantic model 242 also distinguishes between attributes that are measures (e.g., attributes that can be measured, aggregated, or used for mathematical operations) and dimensions (e.g., fields that cannot be aggregated except by counting). In some implementations, the semantic models 242 include one or more concept graphs that encapsulate semantic information for the data sources 240. In some implementations, the one or more concept graphs are organized as directed acyclic graphs, and/or embody hierarchical inheritance of semantics between one or more entities (e.g., logical fields, logical tables, and data fields). Thus, the semantic models 242 help with inferencing and assigning semantic roles to fields;

one or more object models 108, which identify the structure of the data sources 240. In an object model (or a data model), the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

In some implementations, the computing device 200 stores a data prep application 230, which can be used to analyze and massage data for subsequent analysis (e.g., by a data visualization application 222). FIG. 5 illustrates one example of a data prep user interface 500. The data prep application 230 enables user to build flows 523, as described in more detail below.

In some implementations, the computing device 200 stores a predictive analytics application 250. The predictive analytics application 250 includes a predictive analytics generation module 252, which takes the user input (e.g., user selection of a data source 240, a data field of the data source, and a modeling objective) and automatically executes a no-code machine learning (ML) model to build a workflow that delivers predictive analytics. The predictive analytics application 250 provides a predictive analytics user interface 600 for a user to select one or more predictive models 254 (e.g., machine learning models) (e.g., a first predictive model 254-1) and generate predictions using the prediction model, based on input from the user and historical data of a data source 240. In some implementations, the predictive analytics application 250 integrates predictions from the models into table calculations, dashboard extensions, and Prep flows, as described in more detail below. In some implementations, the ML model building workflow enables business teams to do "data science as a team sport" and collaborate to deliver predictive analytics that are informed by their business domain knowledge and can be easily integrated into existing business processes.

In some implementations, the computing device 200 stores data 256 that is generated during the predictive modeling, such as model results 258 and/or artifacts 260. As used herein, an artifact 260 is an item generated and exchanged by human or machine actions across an end-to-end automated data science (ML) workflow, which comprises preparation, analysis, deployment, and communication stages. For example, the predictive model 254, descriptive statistics about the model performance, correlations between a target data field and other data fields of a data source 240, data changes that are made (e.g., removal of one or more data columns from the data source or filtering data rows) are artifacts generated in a predictive modeling project.

In some implementations, the computing device 200 stores APIs 262 for receiving API calls from one or more applications (e.g., from a web browser 220, a data visualization application 222, a data prep application 230, a predictive analytics application 250, a data visualization web application 322, or a predictive analytics web application 334), translating the API calls into appropriate actions, and performing one or more actions.

In some implementations, the computing device 200 includes a widget generation module, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
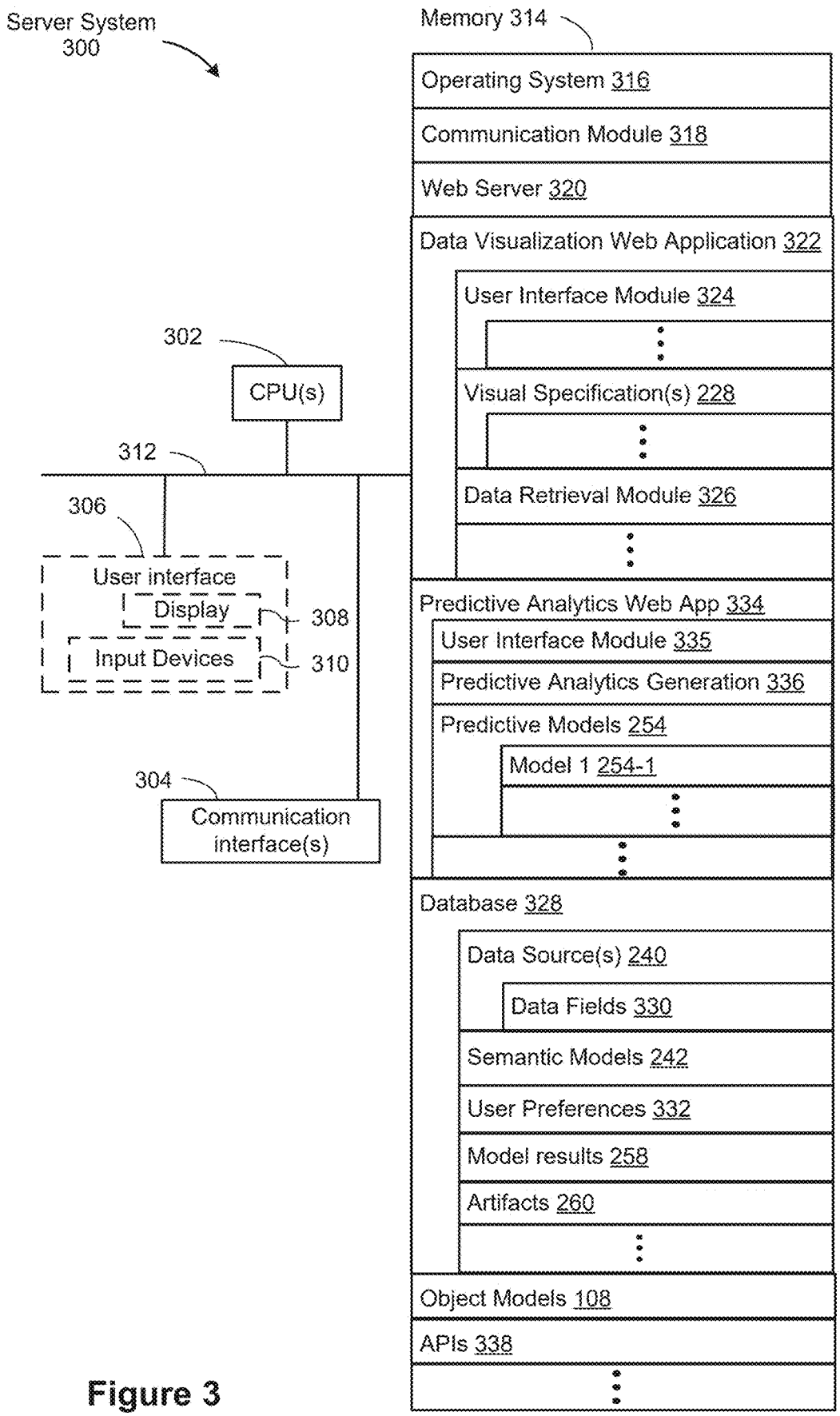
FIG. 3 is a block diagram of a server system according to some implementations.

FIG. 3 is a block diagram illustrating an example server system 300 in accordance with some implementations. In some implementations, the server system 300 is a data visualization server and/or a predictive analytics server. A server system 300 typically includes one or more processing units/cores (CPUs) 302, one or more network interfaces 304, memory 314, and one or more communication buses 312 for interconnecting these components. In some implementations, the server system 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprise a non-transitory computer readable storage medium.

In some implementations, the memory 314 or the computer readable storage medium of the memory 314 stores the following programs, modules, and data structures, or a subset thereof:
  an operating system 316, which includes procedures for handling various basic system services and for performing hardware dependent tasks;
  a network communication module 318, which is used for connecting the server 300 to other computers via the one or more communication network interfaces 304 (wired or wireless) and one or more communication networks, such as the Internet, other wide area networks, local area networks, metropolitan area networks, and so on;
  a web server 320 (such as an HTTP server), which receives web requests from users and responds by providing responsive web pages or other resources;
  a data visualization web application 322, which may be downloaded and executed by a web browser 226 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the web application 322 includes a data retrieval module 326, which builds and executes queries to retrieve data from one or more data sources 242. The data sources 240 may be stored locally on the server system 300 or stored in an external database 328. In some implementations, data from two or more data sources may be blended. In some implementations, the data retrieval module 326 uses a visual specification 228 to build the queries. In some implementations, the visual specification includes one or more aggregate specifications;
  a predictive analytics web application 334, which may be downloaded and executed by a web browser 226 on a user's computing device 200. In general, a predictive analytics web application 334 has the same functionality as a desktop predictive analytics application 250, but provides the flexibility of access from any device at any location with network connectivity, and does not require installation and maintenance. In some implementations, the predictive analytics web application 334 includes various software modules to perform certain tasks. In some implementations, the predictive analytics web application 334 includes a user interface module 335, which provides the user interface for all aspects of the predictive analytics web application 334. In some implementations, the predictive analytics web application 334 includes a predictive analytics generation module 336, which takes user input (e.g., user selection of a data source 240, a data field 330 of the data source 240, a modeling objective) and automatically executes a no-code machine learning (ML) model building workflow to deliver predictive analytics. In some implementations, the predictive analytics web application 334 includes predictive models 254 (e.g., machine learning models) such as predictive model 1 254-1, which is trained to generate predictions based on user input and historical data of a data source 240;
  one or more databases 328, which store data used or created by the data visualization web application 322, the data visualization application 230, the predictive analytics web application 334, the predictive analytics application 250, or the data prep application 230. The databases 328 may store data sources 240, which provide the data used in the generated data visualizations or predictive analytics. Each data source 240 includes one or more data fields 330. In some implementations, the database 328 stores user preferences 332. In some implementations, the database 328 includes a data visualization history log, which tracks each time the data visualization renders a data visualization. In some implementations, the database 328 stores predictive model results 258. In some implementations, the database 328 stores predictive model results 258 by modeling projects. In some implementations, the database 328 stores artifacts 260;

object models 108; and

APIs 338 for receiving API calls from one or more applications (e.g., the web browser 220, the data visualization application 222, the data prep application 230, the predictive analytics application 250, the data visualization web application 322, or the predictive analytics web application 334), translating the API calls into appropriate actions, and performing one or more actions.

The databases 328 may store data in many different formats, and commonly includes many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 240. In some implementations, the database 328 stores a set of user preferences 332 for each user. The user preferences may be used when the data visualization web application 322 (or application 222) makes recommendations about how to view a set of data fields 330. In some implementations, the database 328 stores a data visualization history log, which stores information about each data visualization generated. In some implementations, the database 328 stores other information, including other information used by the data visualization application 222, the data visualization web application 322, the predictive analytics application 250, or the predictive analytics web application 334. The databases 328 may be separate from the server system 300, or may be included with the server system (or both). In some implementations, the database stores semantic models as described above for the computing device 200.

In some implementations, the database 328 includes a data visualization history log and/or a visual analytics history log, which stores visual specifications 228 and/or predictive models selected by users. The history log may include a user identifier, a timestamp of when the data visualization and/or predictive model was created, a list of the data fields used in the data visualization and/or predictive model, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on. Some implementations store a version number and/or version history of trained (e.g., generated) predictive models.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" include various groups, collections, or arrays of servers that provide the described functionality, and the physical servers need not be physically colocated (e.g., the individual physical devices could be spread throughout the United States or throughout the world).

Figure 4:
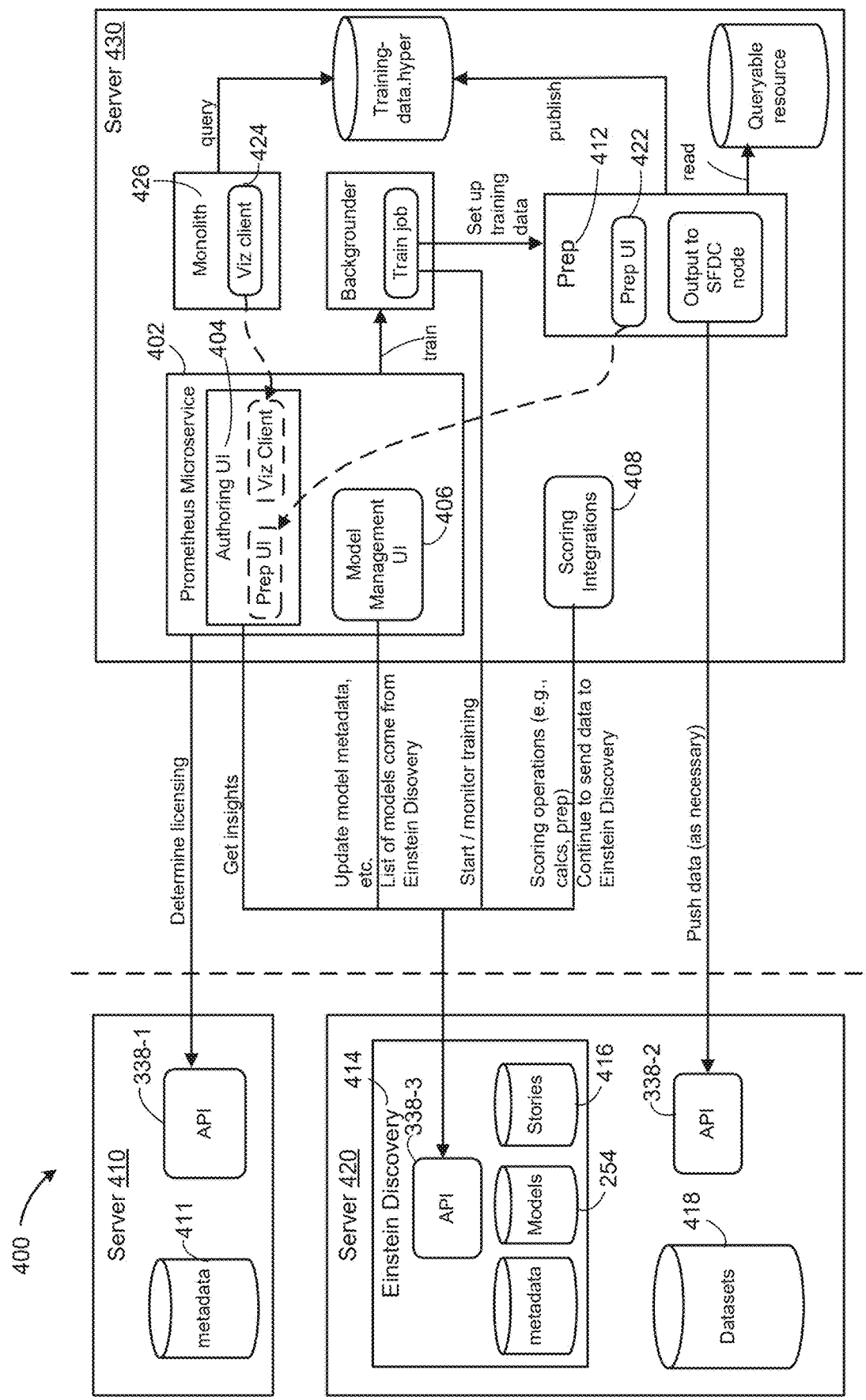
FIG. 4 illustrates an example server architecture 400 for predictive analytics according to some implementations.

FIG. 4 illustrates an example server architecture 400 for predictive analytics according to some implementations. In some implementations, the server architecture 400 includes a first server 410 (e.g., the Salesforce L&P server), a second server 420 (e.g., a Tableau CRM server), and a third server 430 (e.g., a Tableau server) that are communicatively connected with one another. In some implementations, the first server 410 and the second server 420 include APIs 338-1, 338-2, and 338-3 for receiving API calls from one or more applications and/or services residing on the third server 430.

In some implementations, the first server 410 (e.g., the Salesforce L&P server) stores metadata 411 that describes licensing and permissions data.

In some implementations, the second server 420 (e.g., the Tableau CRM server) includes an Einstein Discovery module 414 for making predictions and recommendations based on datasets and their historical trends. The Einstein Discovery module 414 can determine how past data events relate to a key performance indicator (KPI) in question (also known as an "Outcome"). In some implementations, the Einstein Discovery module 414 uses models 254 (e.g., predictive models, machine learning models, or sophisticated custom equations) to predict a particular outcome. Each of the models 254 accepts inputs (one or more explanatory variables) and produces outputs (e.g., a predicted outcome, top factors, and improvements). In some implementations, relationships between past data events and outcomes are depicted as stories 416 and stored on the second server 420. In some implementations, the Einstein Discovery module 414 trains the models 254 using data (e.g., from datasets and/or data sources 240), which may be stored either on the second server 420 or on other servers, such as the third server 430 (e.g., Tableau server) or a data visualization server. In some implementations, the model training datasets 418 are stored on the second server 420.

In some implementations, the third server 430 (e.g., the Tableau server) includes a Prometheus microservice 402 for providing services for predictive analytics and visual analysis. In some implementations, the Prometheus microservice 402 provides an authoring UI 404 for authoring predictive analytics modeling projects. In accordance with some implementations, the Prometheus Microservice 402 receives a request from a user for initiating a predictive modeling project. In response to the request, the third server 430 (e.g., Prometheus microservice 402) can send an API call to the first server 410 (e.g., via the first API 338-1), to have the first server 410 verify (e.g., using the metadata 411) whether the user has the required license and/or credentials for initiating the project. In some implementations, the Prometheus microservice 402 includes a model management UI 406, which can be used to update model metadata of list models coming from Einstein Discovery.

In some implementations, as illustrated in FIG. 4, the authoring UI 404 includes other interfaces, such as a Prep UI 422 (which originated from a data prep module 412) and/or a visualization client UI 424 (which originated from the monolith module 426).

In some implementations, the Prometheus microservice 402 interacts with the Einstein Discovery module 414 via the first API 338-1 to obtain predictive modeling insights, update model metadata (e.g., artifacts), start model training, and/or monitor model training.

In some implementations, the third server 430 includes a scoring integrations module 408 for performing scoring operations. The scoring operations can include consolidating data in a dataset and/or data source, creating calculations based on data values of data fields in a data source 240, and/or preparing data such as removing extremes, outliers, missing values, incorrect values, skew and cardinality. In some implementations, the scoring operations are performed before model training so as to optimize the data for machine learning and modeling.

User Interface for Data Prep

Figure 5A:
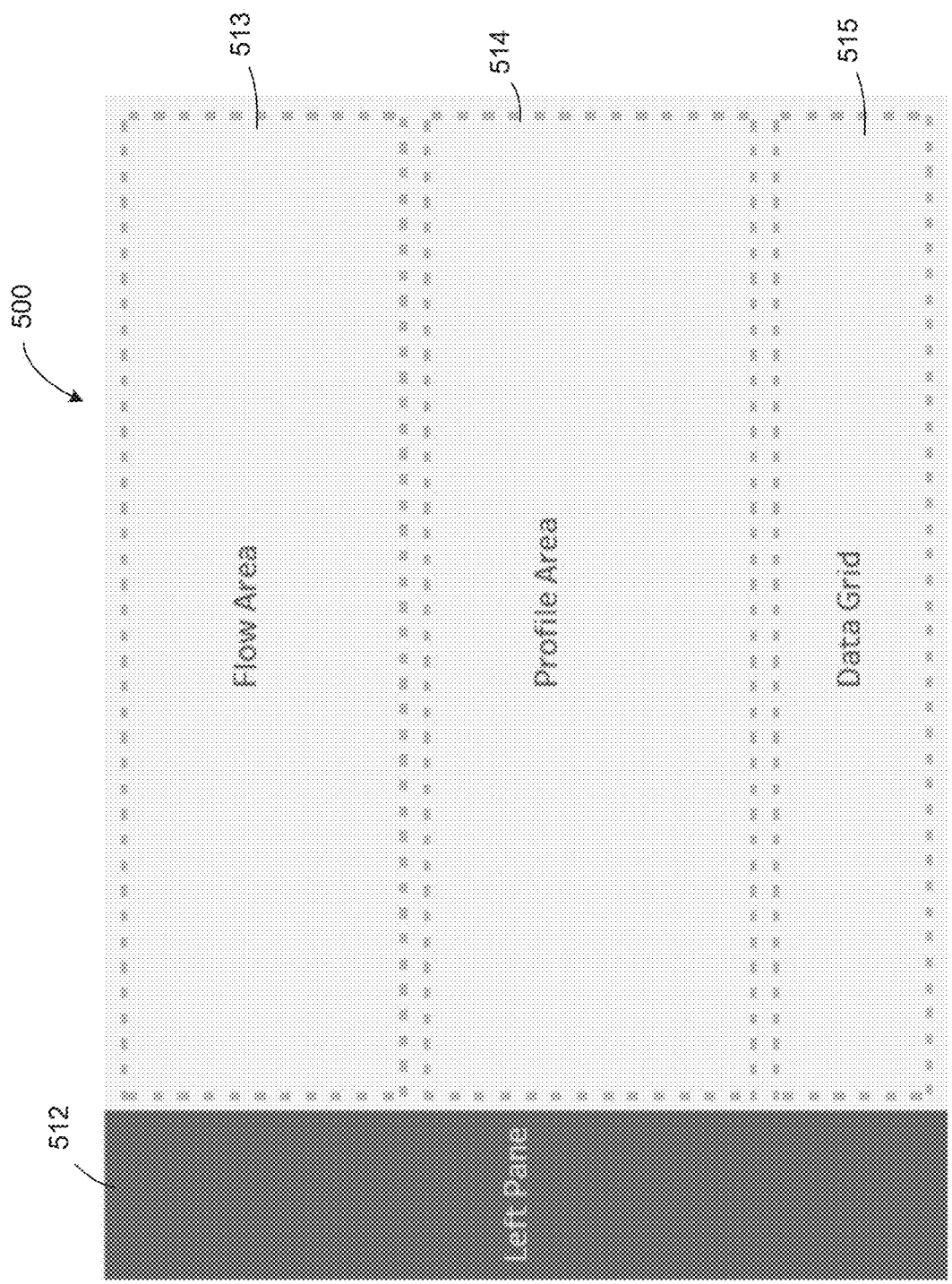
FIGS. 5A and 5B illustrate a user interface 500 for data preparation according to some implementations.
Figure 5B:
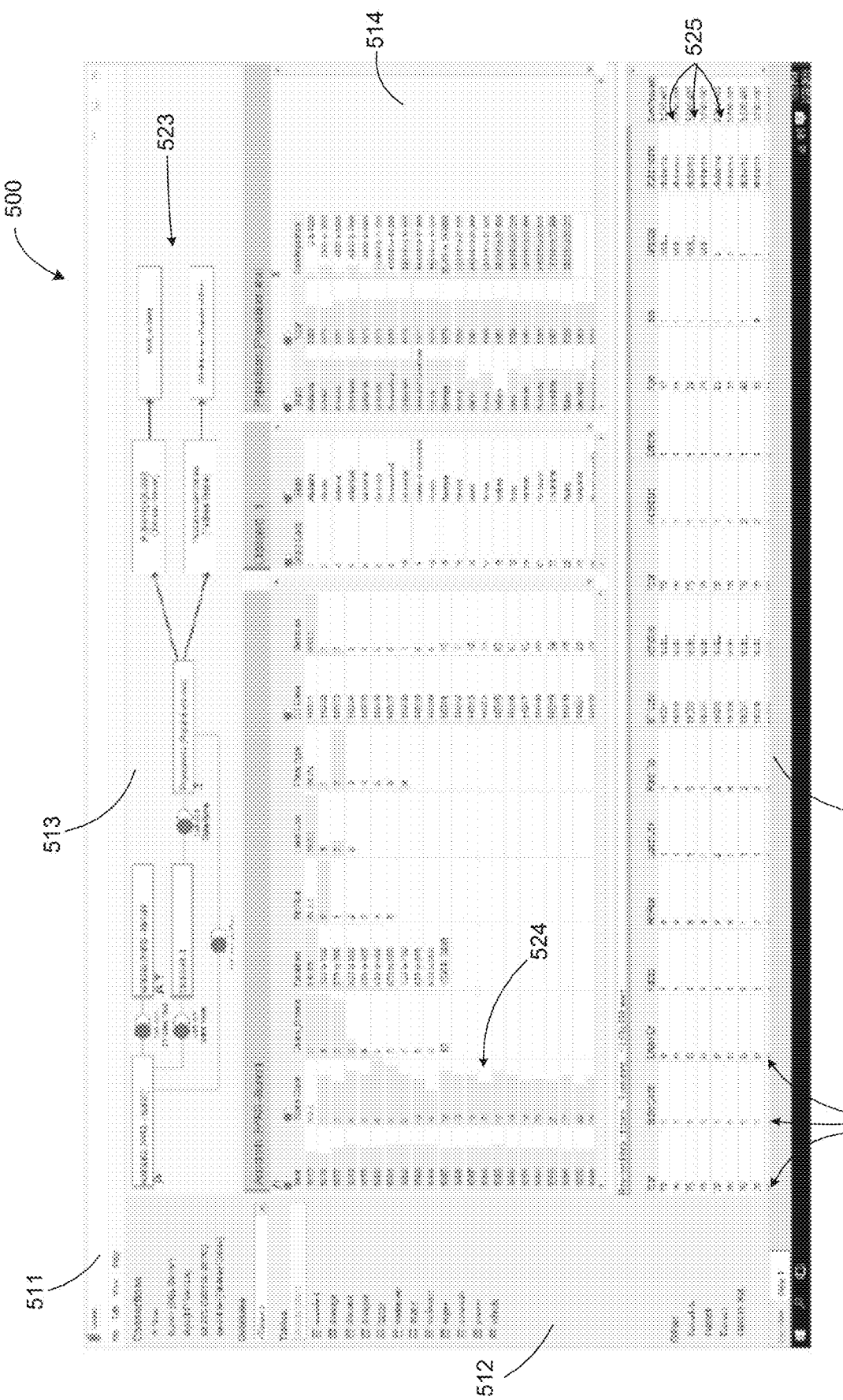

FIGS. 5A and 5B illustrate a user interface 500 for data preparation according to some implementations.

FIG. 5A illustrates an overview of the user interface 500 for data preparation, showing panes that group together different functionality. In some implementations, the left-hand pane 512 provides options for a user to locate and connect to data or to perform operations on already selected data. In some implementations the flow area 513 illustrates one or more operations at nodes to perform on selected data (e.g., data manipulations to prepare data for analysis). In some implementations the profile area 514 provides information about the data set at the currently selected node (e.g., histograms of data value distributions for some of the data fields in the data set). In some implementations, the data grid 515 provides raw data values in rows and columns of the data set at the currently selected node.

FIG. 5B provides a concrete example of a user interface 500 for data preparation, showing the user interface elements in each of the panes. The menu bar 511 includes one or more menus, such as a File menu and an Edit menu. Although the edit menu is available, more changes to the flow are performed by interacting with the flow pane 513, the profile pane 514, or the data pane 515.

In some implementations, the left-hand pane 512 includes a data source palette/selector. The left-hand pane 512 also includes an operations palette, which displays operations that can be placed into the flow. In some implementations, the list of operations includes arbitrary joins (of arbitrary type and with various predicates), union, pivot, rename and restrict column, projection of scalar calculations, filter, aggregation, data type conversion, data parse, coalesce, merge, split, aggregation, value replacement, and sampling. Some implementations also support operators to create sets (e.g., partition the data values for a data field into sets), binning (e.g., grouping numeric data values for a data field into a set of ranges), and table calculations (e.g., calculate data values, such as percent of total, for each row, which depends not only on the data values in each row, but also on other data values in the table).

The left-hand pane 512 also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 513 displays a visual representation (e.g., a node/link flow diagram) 523 for the current flow. The Flow Pane 513 provides an overview of the flow, which serves to document the process. As the number of nodes increases, implementations typically add scroll boxes. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 513 shows just the nodes within the super node, and the flow pane 513 has a heading that identifies what portion of the flow is being displayed. Implementations typically enable multiple hierarchical levels.

A complex flow is likely to include several levels of node nesting. Different nodes within the flow diagram 523 perform different tasks, and thus the node internal information is different. In addition, some implementations display different information depending on whether or not a node is selected. A flow diagram 523 provides an easy, visual way to understand how the data is getting processed, and keeps the process organized in a way that is logical to a user.

In some implementations, the profile pane 514 includes schema information about the data set at the currently selected node (or nodes) in the flow pane 513. As illustrated here, the schema information provides statistical information about the data, such as a histogram 524 of the data distribution for each of the fields. A user can interact directly with the profile pane to modify the flow 523 (e.g., by selecting a data field for filtering the rows of data based on values of that data field). The profile pane 514 also provides users with relevant data about the currently selected node (or nodes) and visualizations that guide a user's work. For example, the histograms 524 show the distributions of the domains of each column. Some implementations use brushing to show how these domains interact with each other.

The data pane 515 displays the rows 525 of data corresponding to the selected node or nodes in the flow pane 313. Each of the columns 526 corresponds to one of the data fields. A user can interact directly with the data in the data pane to modify the flow 523 in the flow pane 513. A user can also interact directly with the data pane to modify individual field values. In some implementations, when a user makes a change to one field value, the user interface applies the same change to all other values in the same column whose values (or pattern) match the value that the user just changed.

The sampling of data in the data pane 515 is selected to provide valuable information to the user. For example, some implementations select rows that display the full range of values for a data field (including outliers). As another example, when a user has selected nodes that have two or more tables of data, some implementations select rows to assist in joining the two tables. The rows displayed in the data pane 515 are selected to display both rows that match between the two tables as well as rows that do not match. This can be helpful in determining which fields to use for joining and/or to determine what type of join to use (e.g., inner, left outer, right outer, or full outer).

Although a user can edit a flow diagram 523 directly in the flow pane 513, changes to the operations are typically done in a more immediate fashion, operating directly on the data or schema in the profile pane 514 or the data pane 515 (e.g., right clicking on the statistics for a data field in the profile pane to add or remove a column from the flow).

User Interface for ML Workflow

In accordance with some implementations of the present disclosure, an experience that allows teams to collaboratively translate the historical data they have connected to a data analytics application (e.g., Tableau), and their domain knowledge, into better decisions augmented by leading-edge ML models can include the following steps:

- Business scientists start by creating a modeling project built around a simple flow-based UI and inviting team members to discuss the problem and share input throughout the process;
- The team chooses an existing data source 240 (e.g., on a computing device or on a server system such as a data visualization server, the server 300, the second server 420, or the third server 430) or uses Prep web authoring to prepare training data for the project;
- Users then discuss and describe their business question by selecting a field in the data and a modeling objective corresponding to the field (e.g., whether they want to increase it (e.g., sales, profit, or conversions) or decrease it (e.g., churn or defects)). In some implementations, the data automatically flows to a server (e.g., the second server 420, in the Einstein Discovery module 414) to fit an optimal model to the user's business requirements;
- In some implementations, the second server 420 (e.g., the Einstein Discovery module 414) augments the modeling process by visually surfacing statistically significant patterns, which can be shared as Tableau workbooks. Teams use these insights to explore the model and rapidly iterate to improve accuracy;
- Throughout the process, a user experience centered on model interpretability and automated bias detection helps collaborators understand model results and potential pitfalls in plain business language; and
- In some implementations, after determining that a model is safe and useful, users can publish it to start generating predictions. Predictions can be consumed in data and data visualizations, tracked for performance and data drift, and integrated into a data catalog that is stored on a server system (e.g., a data visualization server, the server 300, the second server 420, or the third server 430).

Figure 6A:
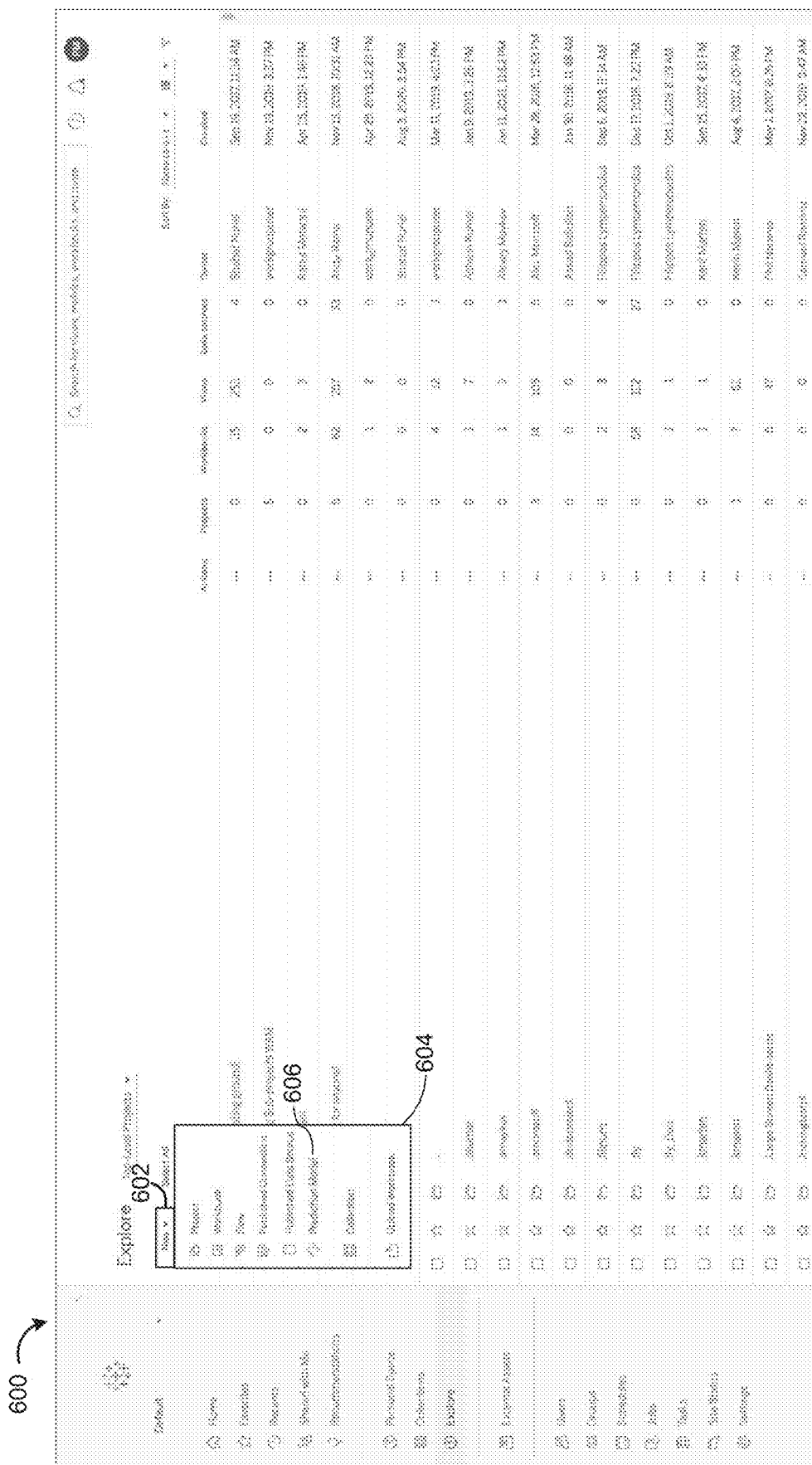
FIGS. 6A-6AA illustrate a series of screenshots of a graphical user interface 600 for a machine learning (ML) workflow, in accordance with some implementations.

FIGS. 6A-6AA illustrate a series of screenshots of a graphical user interface 600 for a machine learning (ML) workflow, in accordance with some implementations. In some implementations, the graphical user interface 600 corresponds to the authoring UI 404, which executes on a computing device 200. In some implementations, the graphical user interface 600 is an interface that supports integrated visual and predictive analytics.

In some implementations, the experience starts with a user (e.g., a project creator, such as a business scientist) creating a modeling project. FIG. 6A illustrates user selection of an icon 602 (e.g., a "New" icon). In response to user selection of the icon 602, the graphical user interface 600 displays a dropdown menu 604. The user can select a "Prediction Model" 606 option to create (e.g., initiate) a new modeling project.

Figure 6B:
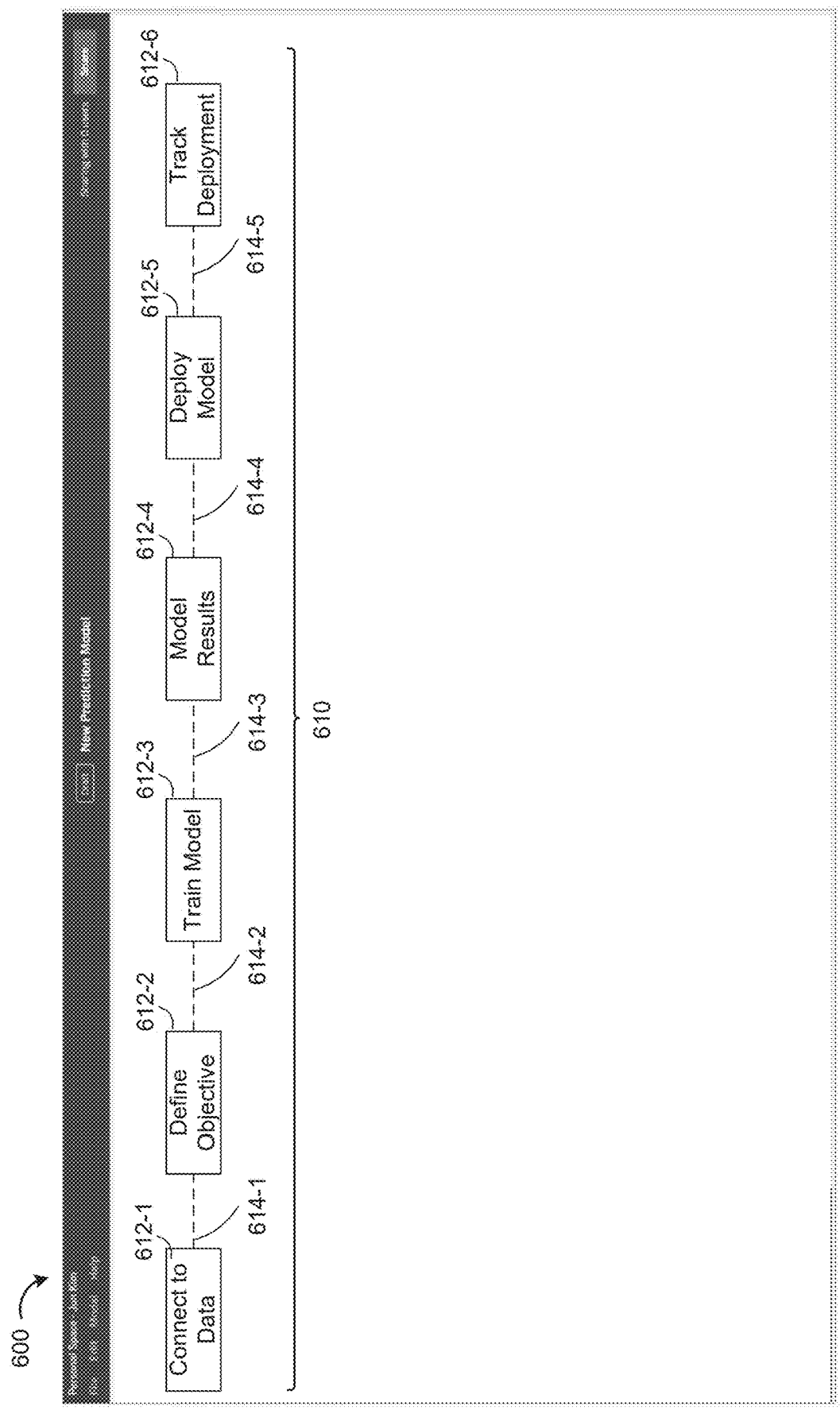

In some implementations, in response to the creation of a modeling project, the graphical user interface 600 displays a workflow 610 (e.g., a ML workflow, a workflow interface, or a workflow pipeline) as illustrated in FIG. 6B. The workflow 610 includes blocks 612, each corresponding to a step of the workflow. For example, the steps can include (i) "Connect to Data" (e.g., connect to a data source), represented by the first block 612-1, (ii) "Define objective" (e.g., defining a modeling objective), represented by the second block 612-2, (iii) "Train Model," represented by the fourth block 612-3, (iv) "Model Results," represented by the fourth block 612-4, (v) "Deploy Model," represented by the fifth block 612-5, and (vi) "Track Deployment," represented by the sixth block 612-6.

In some implementations, as illustrated in FIG. 6B, the workflow 610 includes lines 614 connecting adjacent blocks 612.

In some implementations, each of the blocks 612 (e.g., steps) of the workflow 610 is a user-selectable element in the graphical user interface 600. In some implementations, at the start of the modeling project, the graphical user interface 600 displays each of the blocks 612 as grayed out (e.g., as an inactive or visually de-emphasized) and each of the lines 614-1, 614-2, 614-3, 614-4, and 614-5 as a dashed line. In some implementations, execution of a particular step (e.g., "Connect to Data") causes the corresponding block (e.g., the first block 612-1) and/or text within the block to be visually emphasized (e.g., not grayed out or text displayed with a dark color) in the graphical user interface 600, as illustrated in FIG. 6F. In some implementations, execution of a particular step (e.g., "Connect to Data") causes the connecting lines to be displayed as solid lines, as illustrated in FIG. 6F. In some implementations, even though the blocks 612 (e.g., steps) are displayed sequentially in the workflow 610, a user can elect to execute certain steps while bypassing other steps.

Figure 6C:
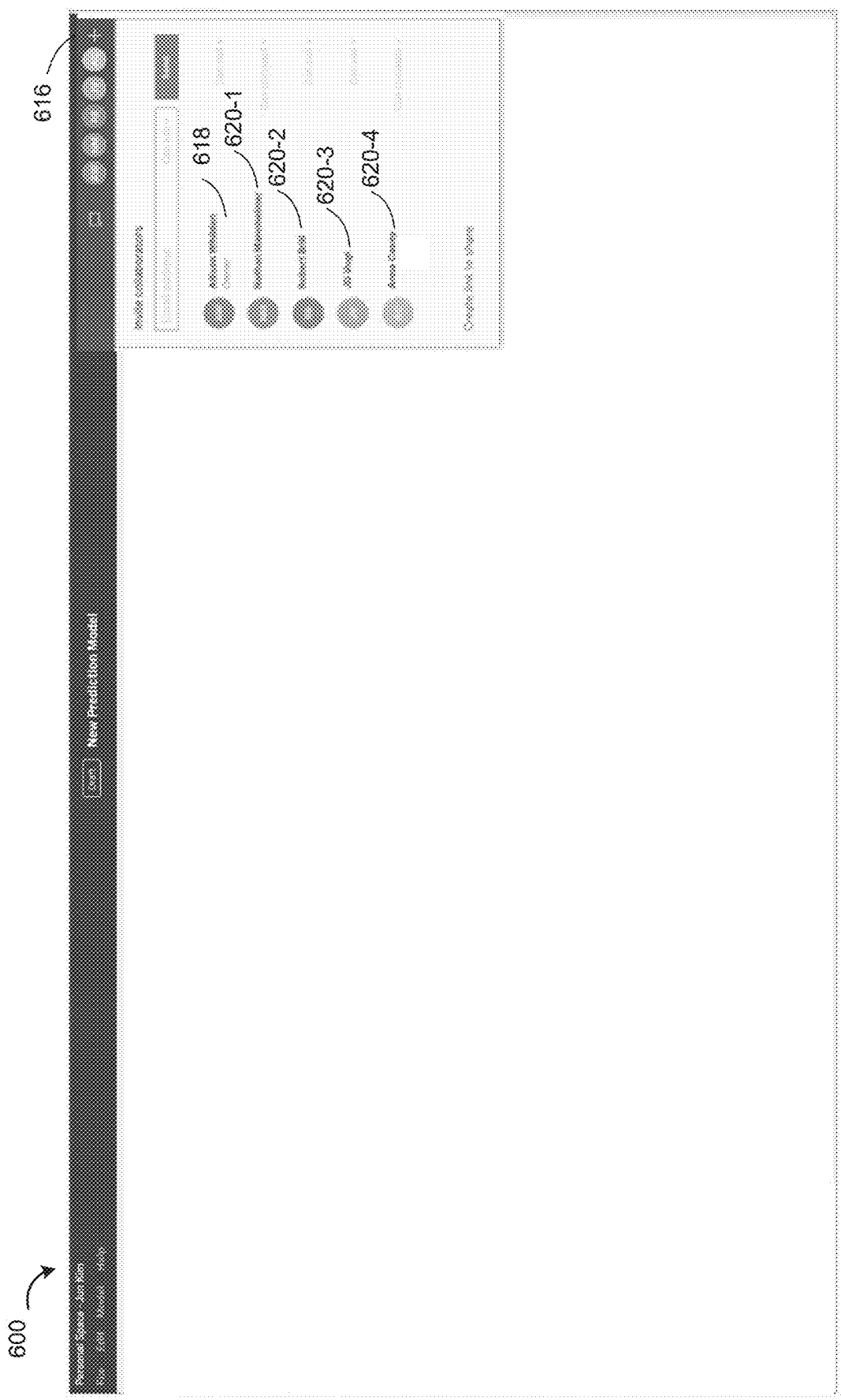

FIG. 6C illustrates user specification of additional team members to the modeling project. In some implementations, as illustrated in FIG. 6C, the graphical user interface 600 includes an "Add" affordance 616, which, when selected by a user, enables the user to invite other users 620 to collaborate on the modeling project. The team (e.g., including the user/Owner 618 and the other users 620) can explore insights and deploy and manage predictive models entirely within a sever system. As an example, business scientists can collaborate directly with front office teams to make sure they are looking at all the relevant data and are factoring in domain knowledge. In some implementations, the user can also assign respective access rights (e.g., editing and/or commenting rights) to each of the other users 620.

Figure 6D:
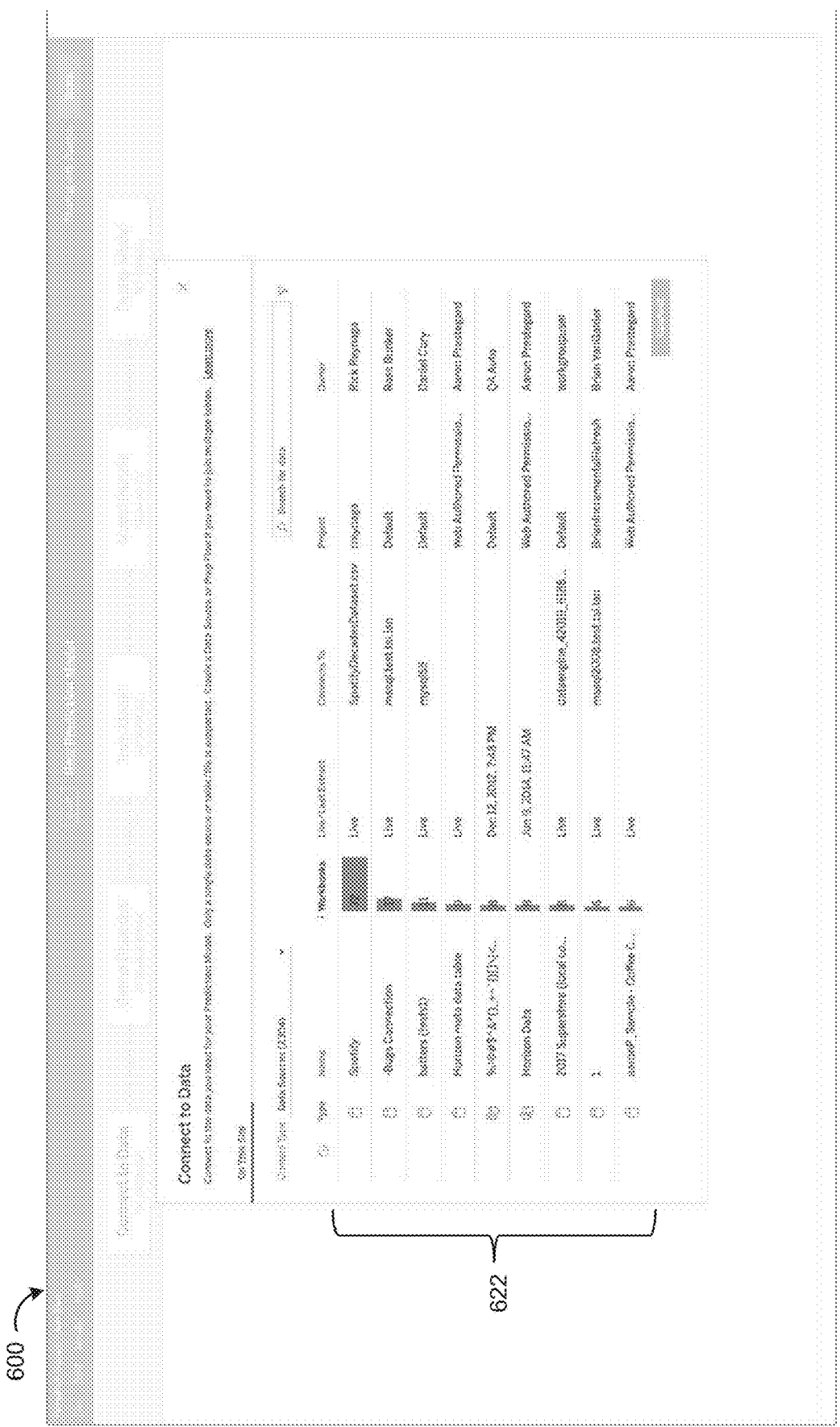

In some implementations, the user can initiate a new modeling project from an existing published data source. FIG. 6D illustrates the graphical user interface 600 displaying a list 622 of published data sources (e.g., data sources 240). The user can select a published data source to initiate a new modeling project. In some implementations, the user can initiate a new modeling project from a Prep flow, such as the flow illustrated in FIGS. 5A and 5B. In some implementations, the modeling project can be created from scratch, or created by combining multiple data sources.

Figure 6E:
Figure 6F:
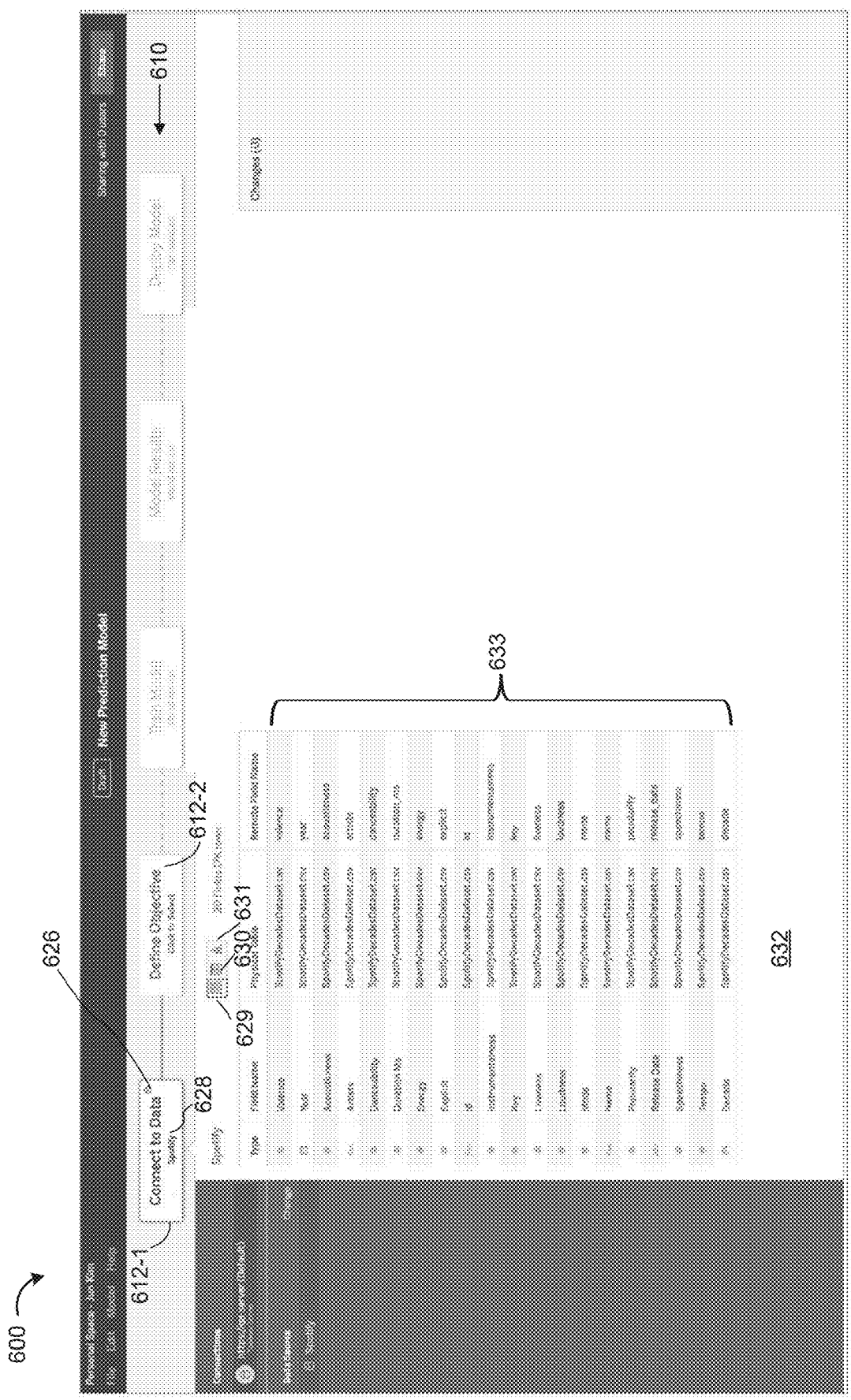

FIG. 6E illustrates user selection of a "Spotify" data source 624 from the list 622.

FIG. 6F illustrates, in response to user selection of a data source, the graphical user interface 600 displays a checkmark 626 (e.g., a green checkmark) inside the first block 612-1 (e.g., corresponding to the step "Connect to Data") to indicate completion of the step. In some implementations, the graphical user interface 600 displays a name 628 of the data source (e.g., "Spotify") as text inside the first block 612-1.

Figure 6G:
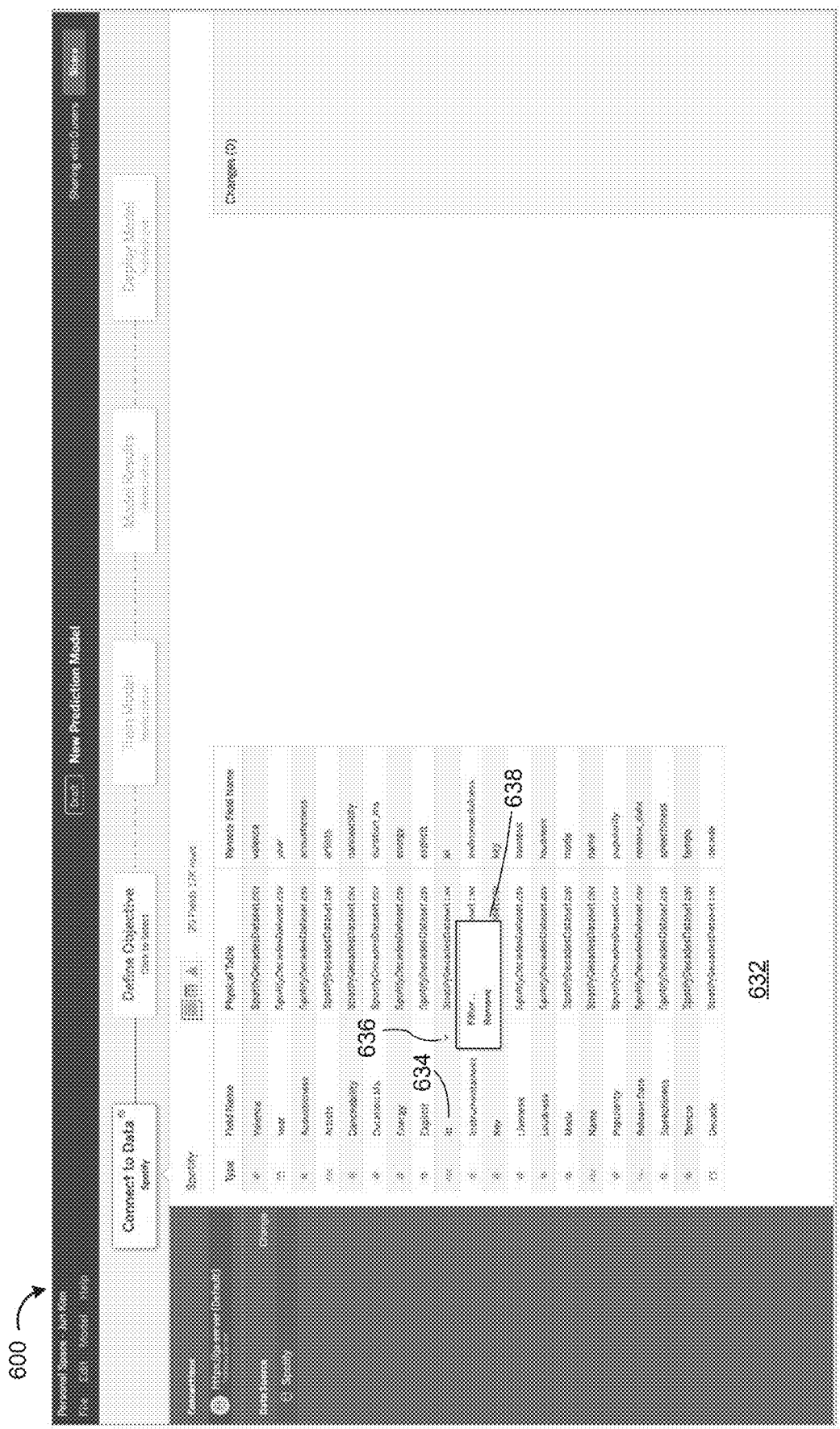
Figure 6H:
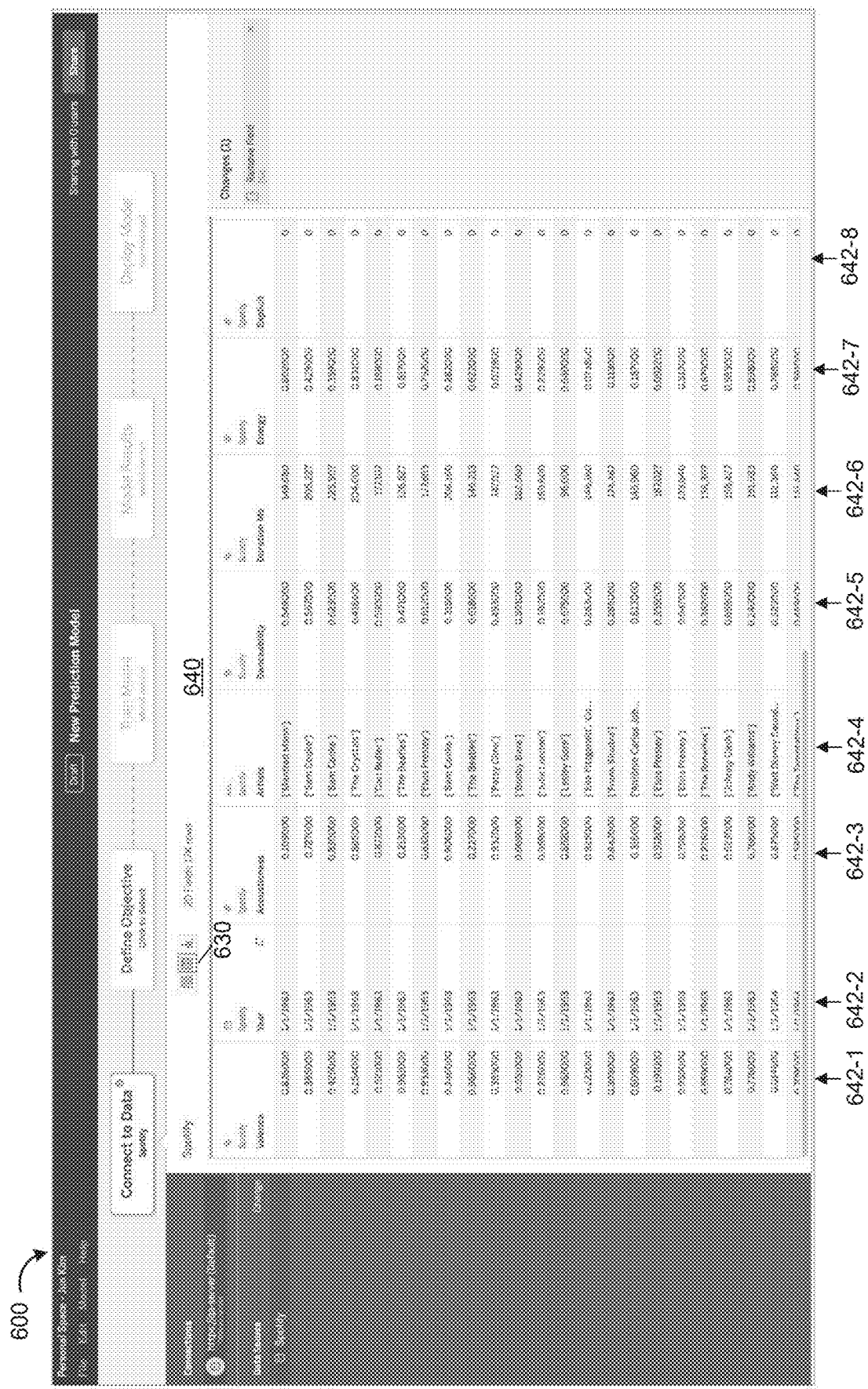
Figure 6I:
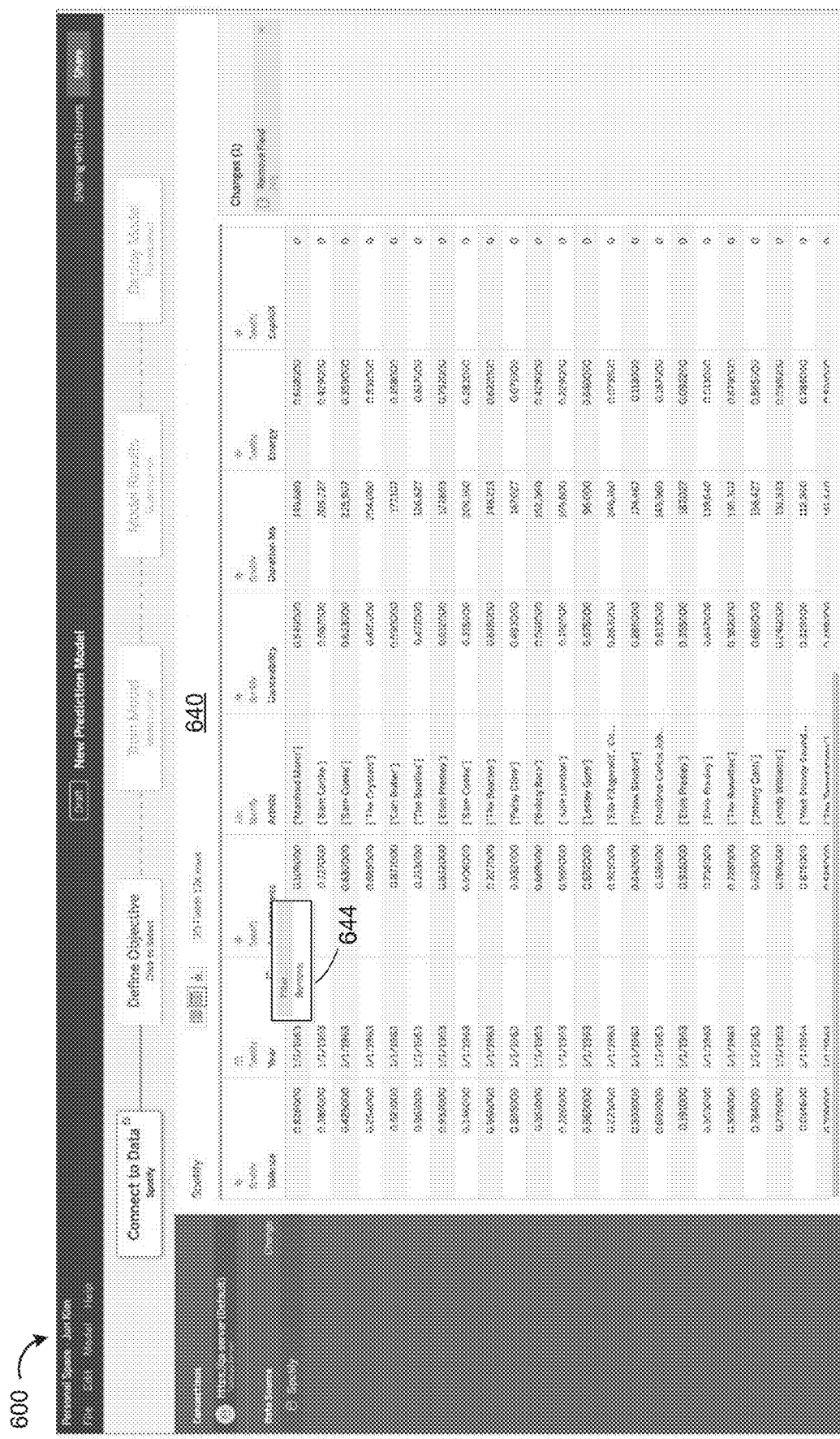
Figure 6J:
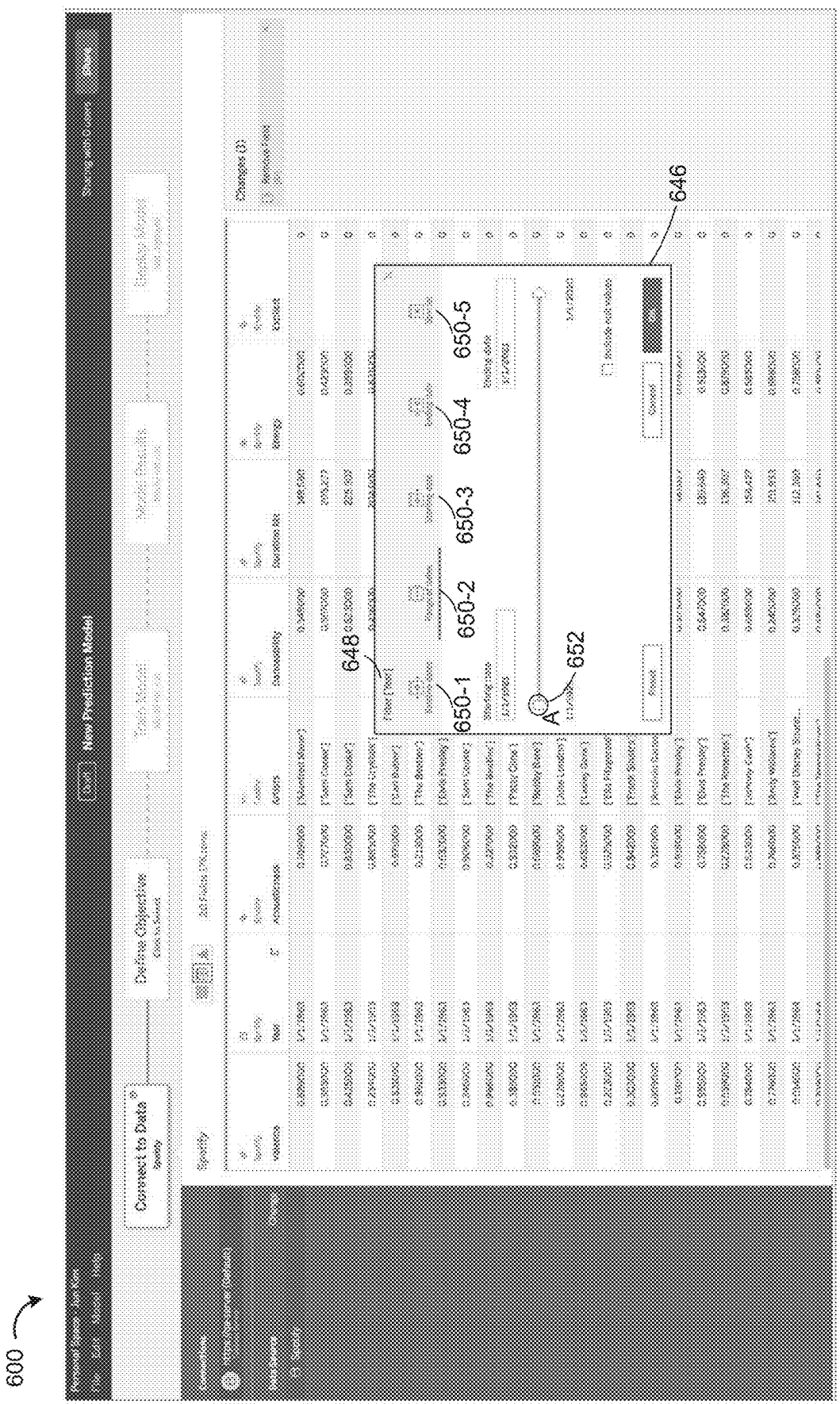

In some implementations, in response to user selection of a data source, the graphical user interface 600 displays various options to display data fields and/or data values of the selected data source. For example, FIG. 6F illustrates a first option 629 for displaying the fields as a list, a second option 630 for displaying the fields as a table, and a third option 631 for displaying the fields as visualizations (e.g., histograms). In some implementations, user selection of the first option 629 causes the data fields to be displayed as a table 632 that includes a plurality of data rows 633, with each of the data rows 633 corresponding to a respective data field of the selected data source, as illustrated in FIG. 6F. In some implementations, user selection of the second option 630 causes the graphical user interface 600 to display a data table 640 that includes a plurality of data columns 642, wherein each of the data columns 642 corresponds to a respective data field of the selected data source, as illustrated in FIG. 6H. In some implementations, user selection of the third option 631 causes the graphical user interface 600 to display a respective data visualization 654 (e.g., a data value histogram) for each data field of the selected data source, as illustrated in FIG. 6L. In the example of FIG. 6L, each of the data fields has a distinct data value histogram. The vertical axis of each bar chart represents the data values corresponding to the data field, while the length of a data bar of the bar chart represents a respective count of the values.

In some implementations, a user can perform operations such as rename data fields, remove data columns, add filters, and/or add perform calculations. For example, the graphical user interface 600 can display a data prep context menu (e.g., corresponding to Prep UI 422, which is presented as part of the user interface 600. FIG. 4) to further clean and shape data or create a new data source entirely for input into the model, in accordance with some implementations. FIGS. 6G and 6I illustrate this functionality.

FIG. 6G illustrates a user interaction with (e.g., user clicking of) an arrow indicator 636 adjacent to a field name 634 corresponding to the data field "Id." In response to the user interaction, the graphical user interface 600 displays a dropdown menu 638 that includes a "Filter" option and a "Remove" option. The "filter" option corresponds to an option to filter data values of a data field to a subset of values that are then used by a predictive model as training data for generating predictions. The "Remove" option corresponds to an option to exclude a data field (and its values) from the dataset for the modeling project (e.g., the data field and its values will not be used as training data for the predictive model).

FIG. 6I illustrates a similar user interaction, this time with a data column 642-2, corresponding to the data field "Year" in the data table 640. Similar to FIG. 6G, in response to the user selection, the graphical user interface 600 displays a dropdown menu 644 that includes a "Filter" option and a "remove" option, whose functions have been discussed above with respect to FIG. 6G. FIG. 6J illustrates that, in response to user selection of the "Filter" option in FIG. 6I, a widget 646 is generated and displayed (e.g., using a widget generation module). The widget 646 identifies the data field 648 (e.g., "Year") to which the filter is applied.

In some implementations, as illustrated in FIG. 6J, the widget 646 includes one or more filtering options 650, such as a first option 650-1 to filter data values of the data field 648 (e.g., "Year") according to their relative dates, a second option 650-2 to filter data values of the data field according to a range of dates, a third option 650-3 to filter data values of the data field according to a starting date, a fourth option 650-4 to filter data values of the data field according to an ending date, and a customized (e.g., special) fifth option 650-5. In this example, the user selects the second option 650-2 to filter data values of the data field "Year" by a range of dates (the user selection is indicated by the line under the second option 650-2).

Figure 6K:
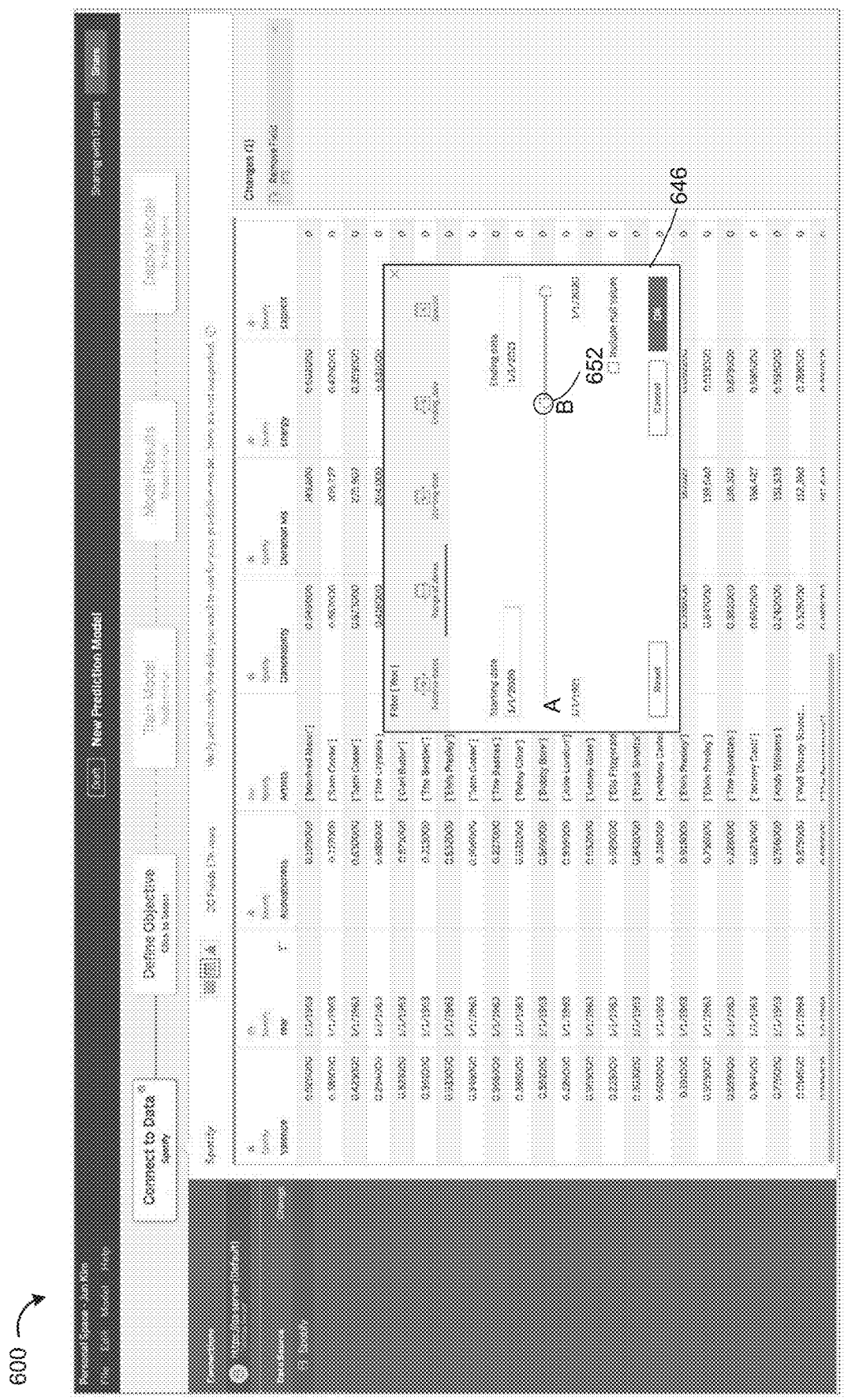
Figure 6L:
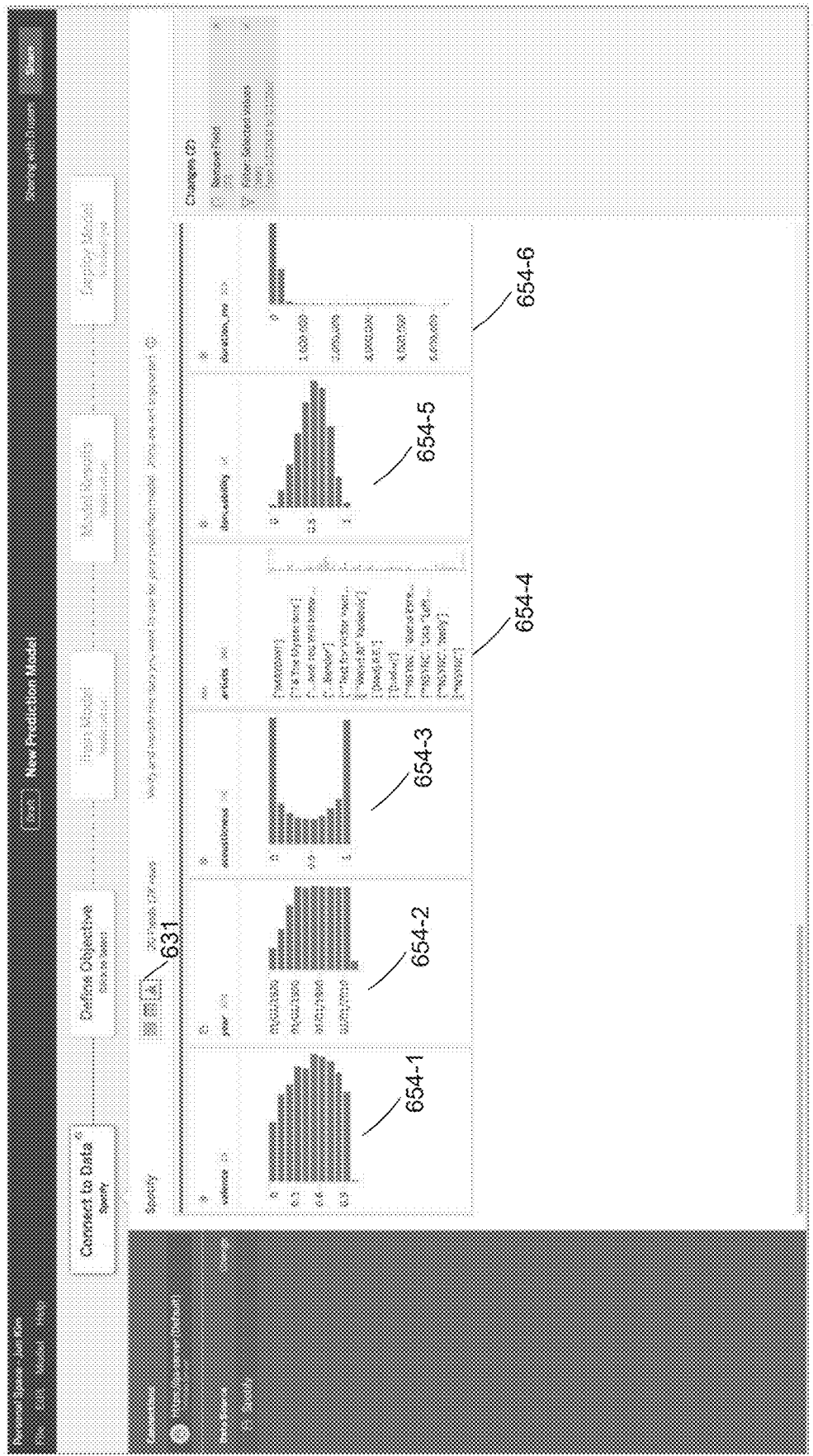

The transition from FIG. 6J to FIG. 6K illustrates another user interaction with a slider bar icon 652. In this example, the user slides (e.g., by holding and dragging using a mouse) the icon 652 from position A in FIG. 6J to position B in FIG. 6K. In response to the user interaction, the range of dates is modified from "Jan. 1, 1921 to Jan. 1, 2021" in FIG. 6J to "Jan. 1, 2020 to Jan. 1, 2021" in FIG. 6K.

In some implementations, once the data corresponding to the data source is in a desired state, a user can proceed to define a modeling objective. This corresponds to the step "Define Objective" (e.g., the second block 612-2) of the workflow 610.

Figure 6M:
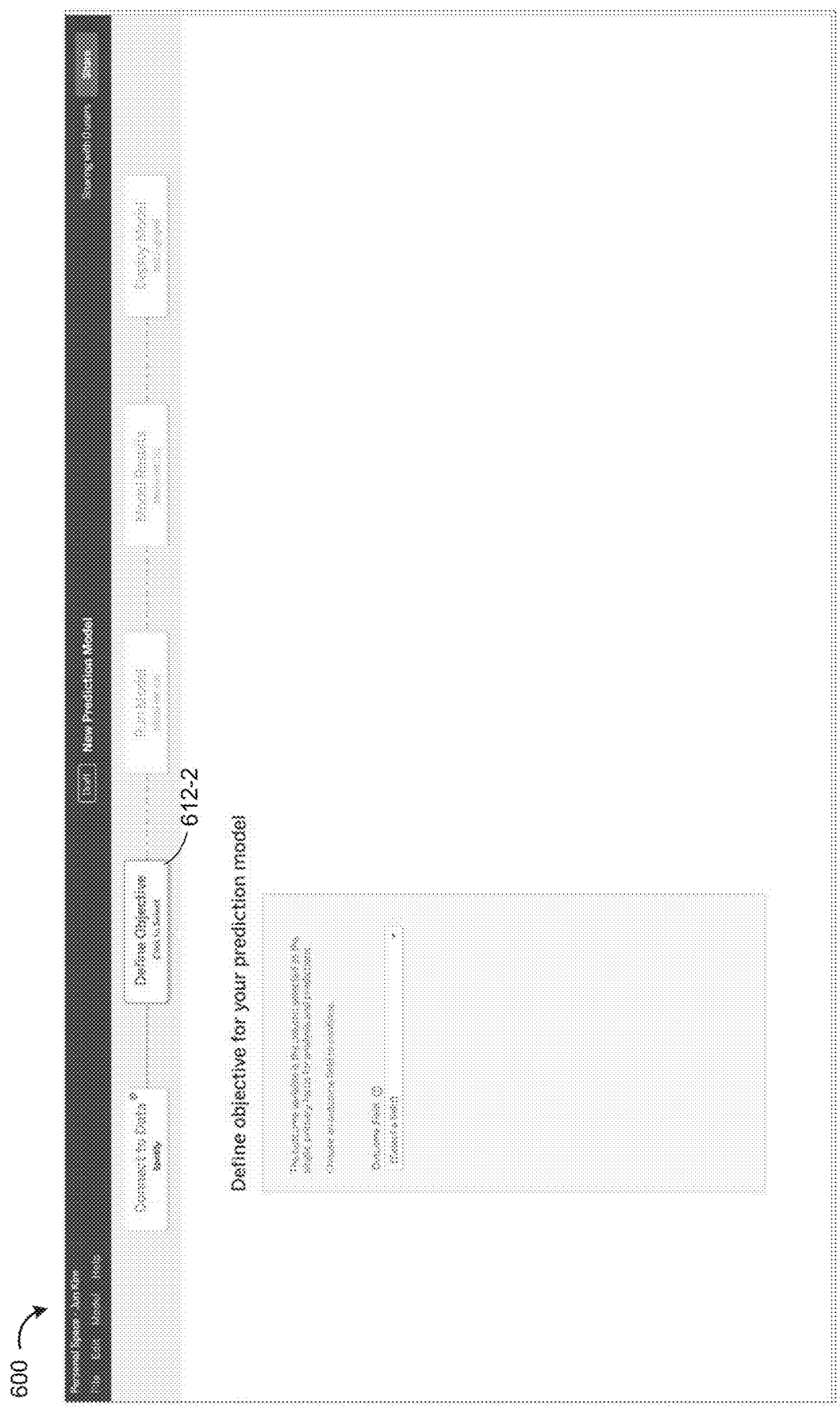
Figure 6N:
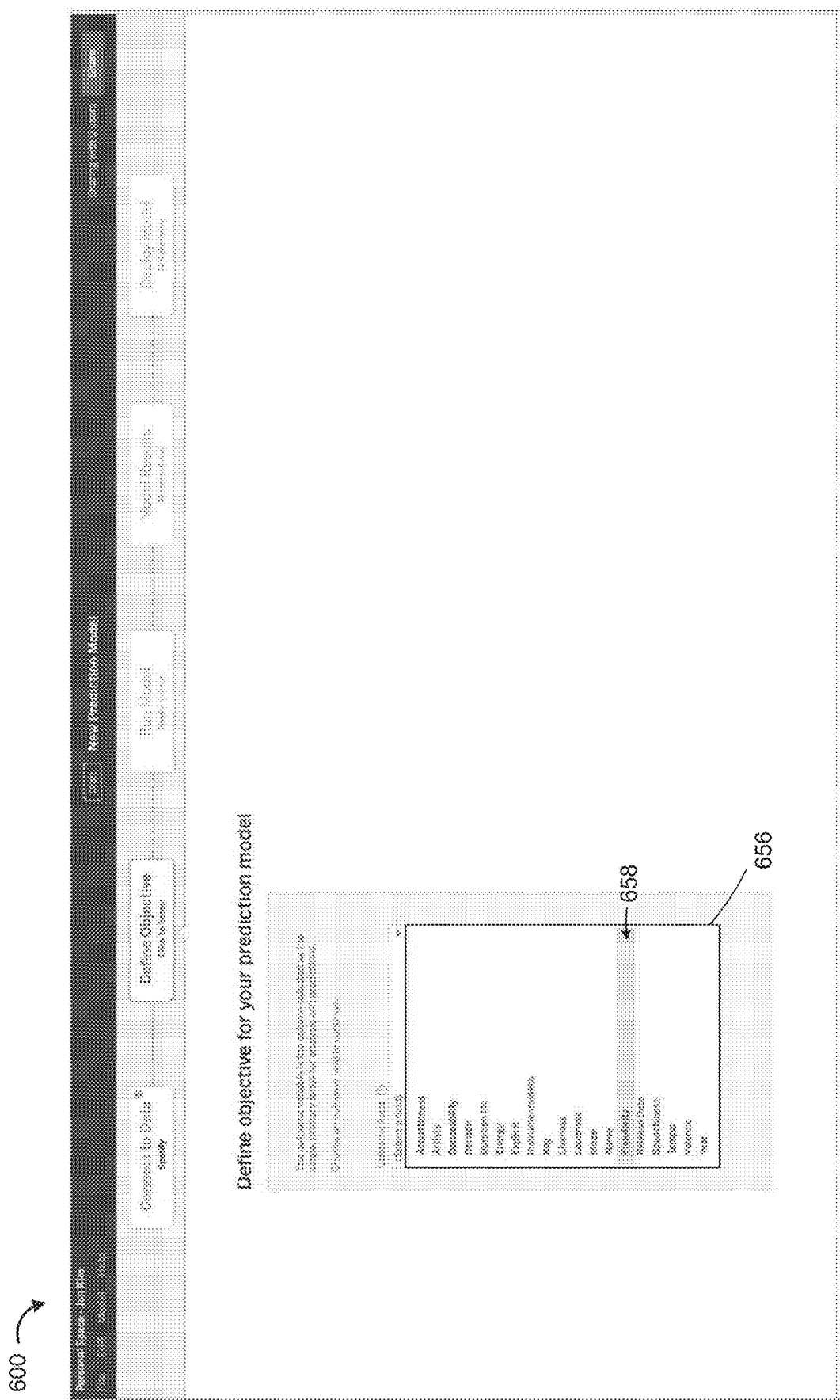
Figure 6O:
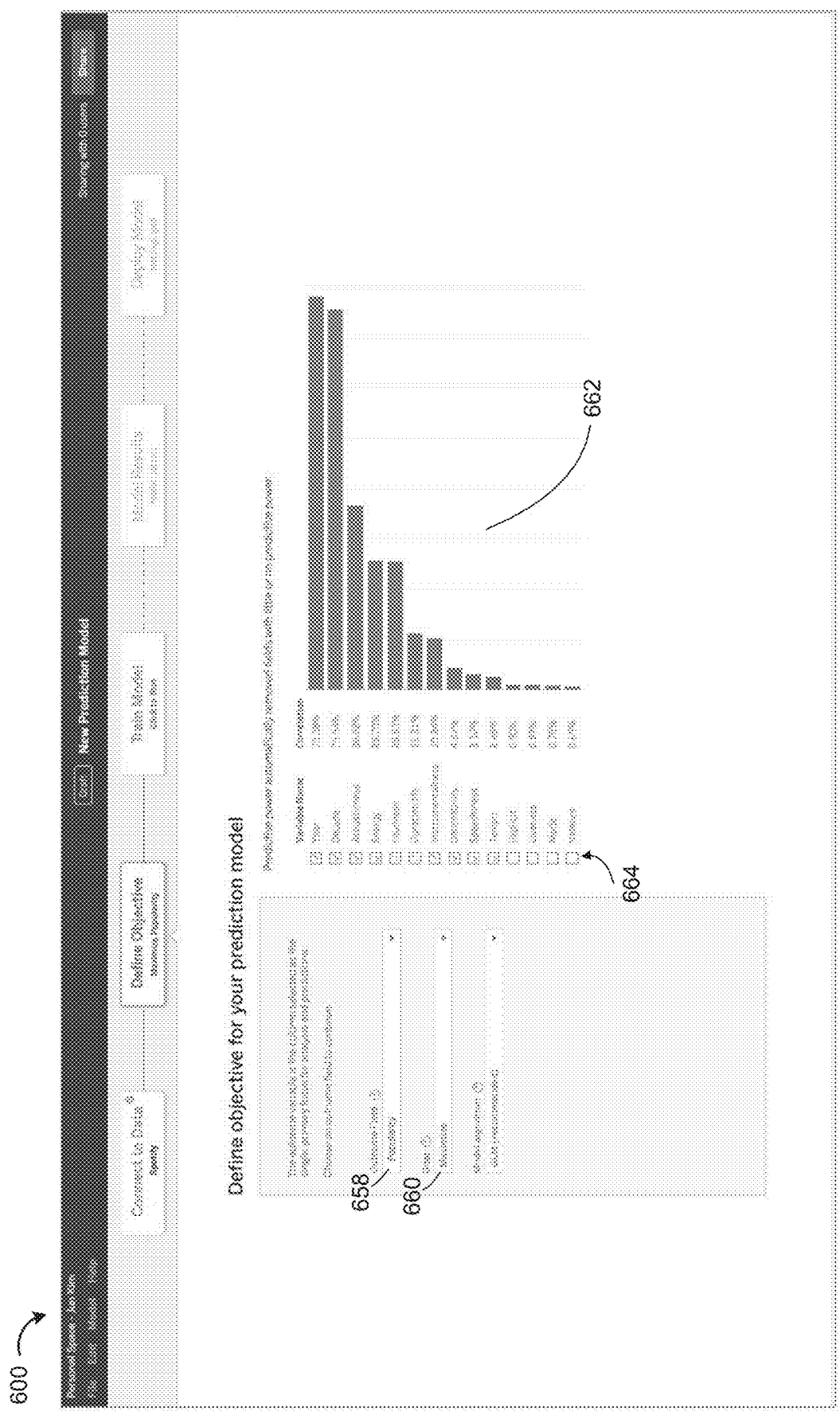

To define the objective for the model, the user selects an outcome field and a modeling goal. The user can either specify a model algorithm or use a default (e.g., predetermined) model algorithm. FIGS. 6M and 6N illustrate user selection of an outcome field (e.g., a target data field) from the selected data source. In the example of FIG. 6N, each of the options that is displayed in the dropdown menu 656 corresponds to a data field in the "Spotify" data source. In FIG. 6O, the user selects data field 658 (e.g., "Popularity") as the target field and a modeling goal (e.g., modeling objective) to "maximize" (660) the target field.

In some implementations, in response to user selection of the target data field, the computing device 200 (or the server 300) determines (e.g., computes or calculates) correlations between the target data field and other data fields of the data source. FIG. 6O illustrates the determined correlations displayed as a ranked chart 662. In this example, each data bar in the chart 662 corresponds to a field name of a data field in the "Spotify" data source and the length of a bar represents the correlation (e.g., as a percentage value) between the target data field (e.g., "Popularity") and the respective data field. The user can select or remove/unselect fields using their respective checkboxes 664. For example, in some circumstances, a user may unselect fields with low correlation. In some implementations, fields with 100% correlation will be automatically unselected to prevent data leakage. In some implementations, the graphical user interface 600 displays a tooltip or information icon to inform the user of why fields are removed/unselected.

In some implementations, once a modeling goal is selected (and confirmed by the user), the automatic modeling (e.g., model training, model generation, model fitting) process begins. This corresponds to the step "Train Model" (the third block 612-3) of the workflow 610.

In some implementations, the data source resides at a data visualization server (e.g., the third server 430, which is the Tableau server) whereas the modeling process (e.g., model training) is performed at another server (e.g., a server that includes a predictive analytics generation module 336 or an Einstein Discovery module 414, such as server 300, the second server 420, or a Tableau CRM server). In this instance, data will be seamlessly transmitted from the data visualization server to the other server for training a predictive model.

In particular, because most of the datasets (e.g., data sources) in the data visualization server are cleaned and ready to use for dashboards to inform their business, users are able to easily bring that cleaned up data into their model building experience.

In some implementations, data that is transmitted from the data visualization server (e.g., the third server 430) to the predictive analytics server (e.g., the second server 420) can include the target data field and its data values. In some implementations, the transmitted data can include at least a subset of data fields of the data source and their corresponding data values. For example, the subset of data fields and/or data values can be be data fields and/or values that have been filtered or have a threshold correlation with the target data field. In some implementations, the transmitted data can include attributes or interpretations (e.g., user intent inferred from natural language processing) of data fields and/or values that were obtained from prior data visualization analyses, calculations. In some implementations, the transmitted data includes data that has been previously prepared for analyses or specifically prepared for model training. In some implementations, the target field and the modeling objective are selected by the user while the modeling objective is selected by the computing device 200 (or the second server 420).

Figure 6P:
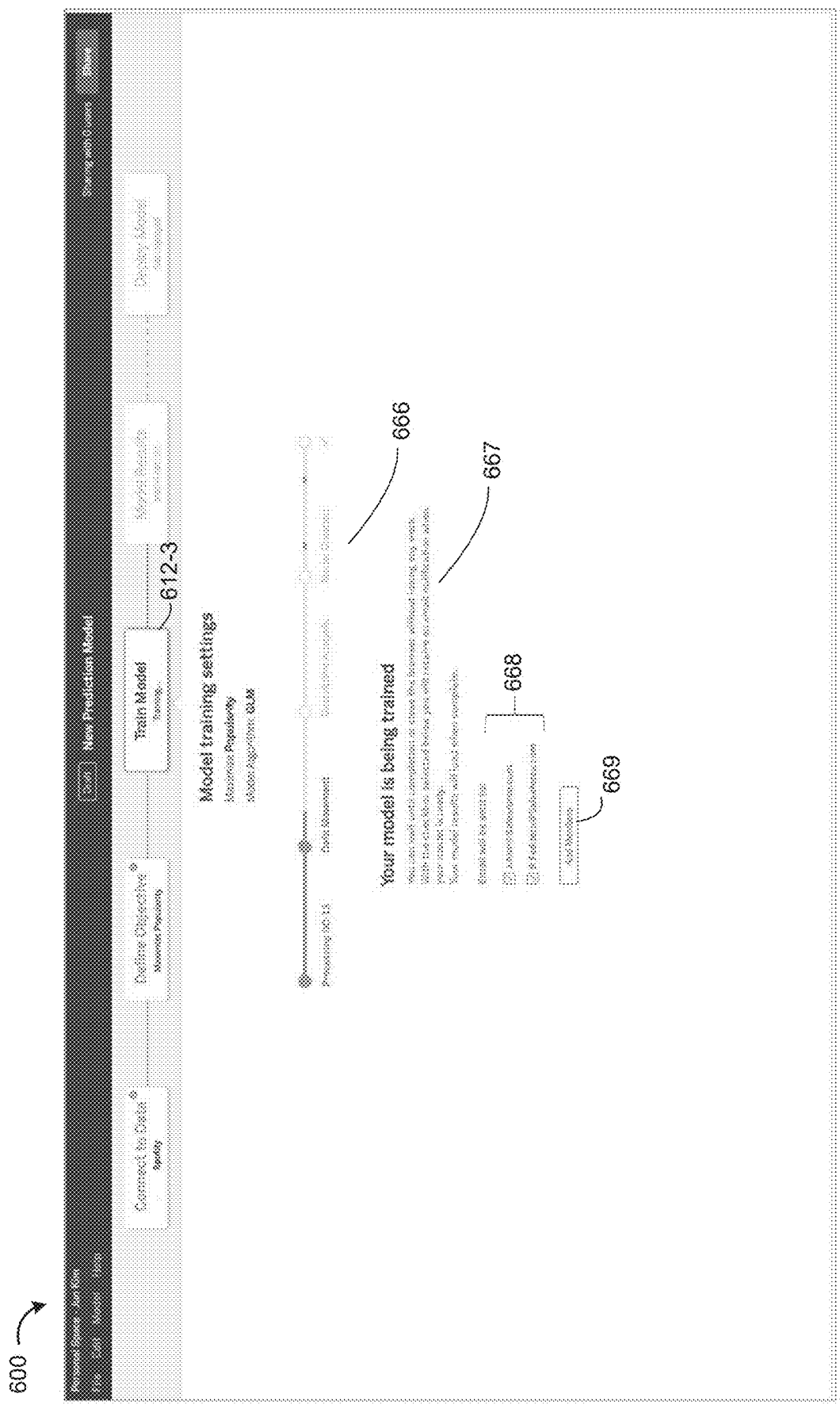

In some implementations, during the model training process, the graphical user interface 600 displays a progress bar 666 (e.g., process bar) with stops, for visualizing a real-time status of the model training. This is illustrated in FIG. 6P. The progress bar 666 can include animations and relevant information such as time elapsed, percentage completed, identification of stages (e.g., 6-10 stages of training), and possible errors encountered.

In some implementations, the model training process can take several minutes (e.g., 5-15 minutes). During this time, the graphical user interface 600 can display a notification 667 (e.g., below the progress bar 666) that informs a user that the user can close the browser without losing work. The user can perform manual exploration of the training data source using embedded web authoring, while waiting for the Discovery engine to complete the generation of automated insights and predictive models.

In some implementations, the graphical user interface 600 identifies one or more users 668 (e.g., the model creator and/or collaborators) that will be notified when the model is complete. In some implementations, the graphical user interface 600 displays one or more other affordances, including an affordance to add more recipients 669, an affordance to notify one or more users via Slack, and/or a "Cancel Run Model" affordance. In some implementations, the graphical user interface 600 also displays progress indication (e.g., a time remaining), and an indication of where to find the pending model (e.g., in the user's personal directory in the computing device 200 or in a directory located on the Cloud).

FIGS. 6Q to 6W illustrate evaluation of the trained model in accordance with some implementations. In some implementations, the evaluation step corresponds to the step "Model Results" (the fourth block 612-4) of the workflow 610. In some implementations, all the information about the model that is shown in the graphical user interface 600 is derived from data that is transmitted to the Prometheus Microservice 402 (e.g., the authoring UI 404, or the graphical user interface 600) from the Einstein Discovery 414 cloud.

Figure 6Q:
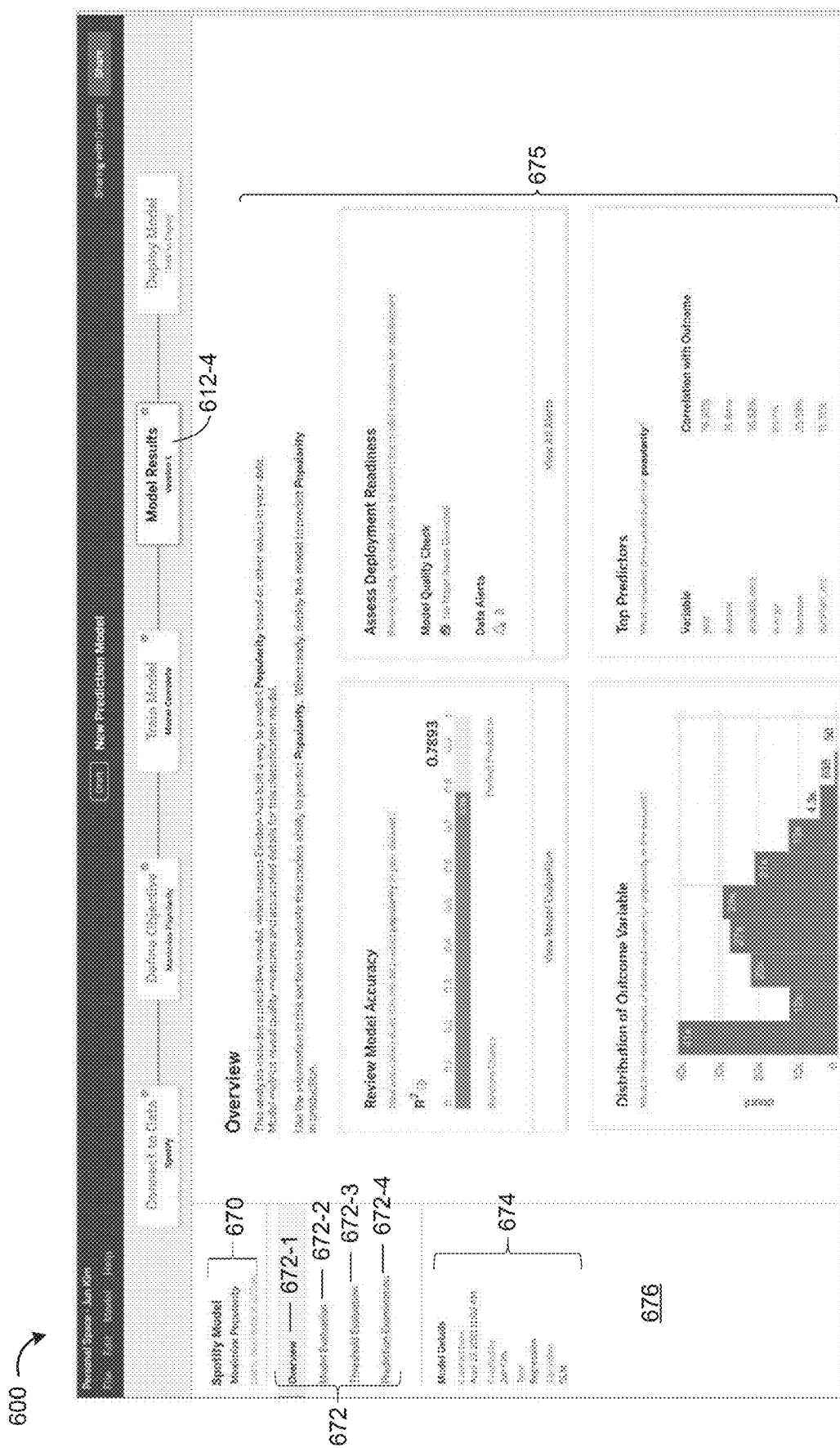

FIG. 6Q illustrates the graphical user interface 600 displaying a title 670 (e.g., a header) of the trained model. The title 670 can include a name (e.g., "Spotify Model"), the target field, the modeling goal ("Maximize Popularity"), and a date/time that the model was last updated. In some implementations, the graphical user interface 600 displays model metrics 672 that enable a user to evaluate the quality of a trained model. The model metrics 672 can include a first metric 672-1 "Overview," which provides a summary of the model's validation results, a second metric 672-2 "Model Evaluation," which provides information about a model's performance, gains and lift, cross-validation results, and coefficient values, a third metric 672-3 "Threshold Evaluation," which helps a user optimize a threshold value for a model, and a fourth metric 672-4 "Prediction Evaluation," which enables a user to interact with the model metrics and see how they stack up against actual outcomes.

In some implementations, and as illustrated in FIG. 6Q, the graphical user interface 600 displays details 674 of the trained model. This can include a date and/or time at which the model was created, a date and/or time that the model was updated, an identification of the user who created the model (e.g., who initiated the modeling project), an identification of the modeling algorithm (e.g., generalized linear model or "GLM"), and/or a type of statistical analysis (e.g., "Regression") that was applied for the model training.

FIG. 6Q also illustrates, in some implementations, the title 670, the metrics 672, and the model details 674 are displayed in a side pane 676 of the graphical user interface 600. In some implementations, the graphical user interface 600 also displays an affordance (e.g., on the side pane 676 or elsewhere) that, when selected, causes the trained model to be deployed.

Figure 6R:
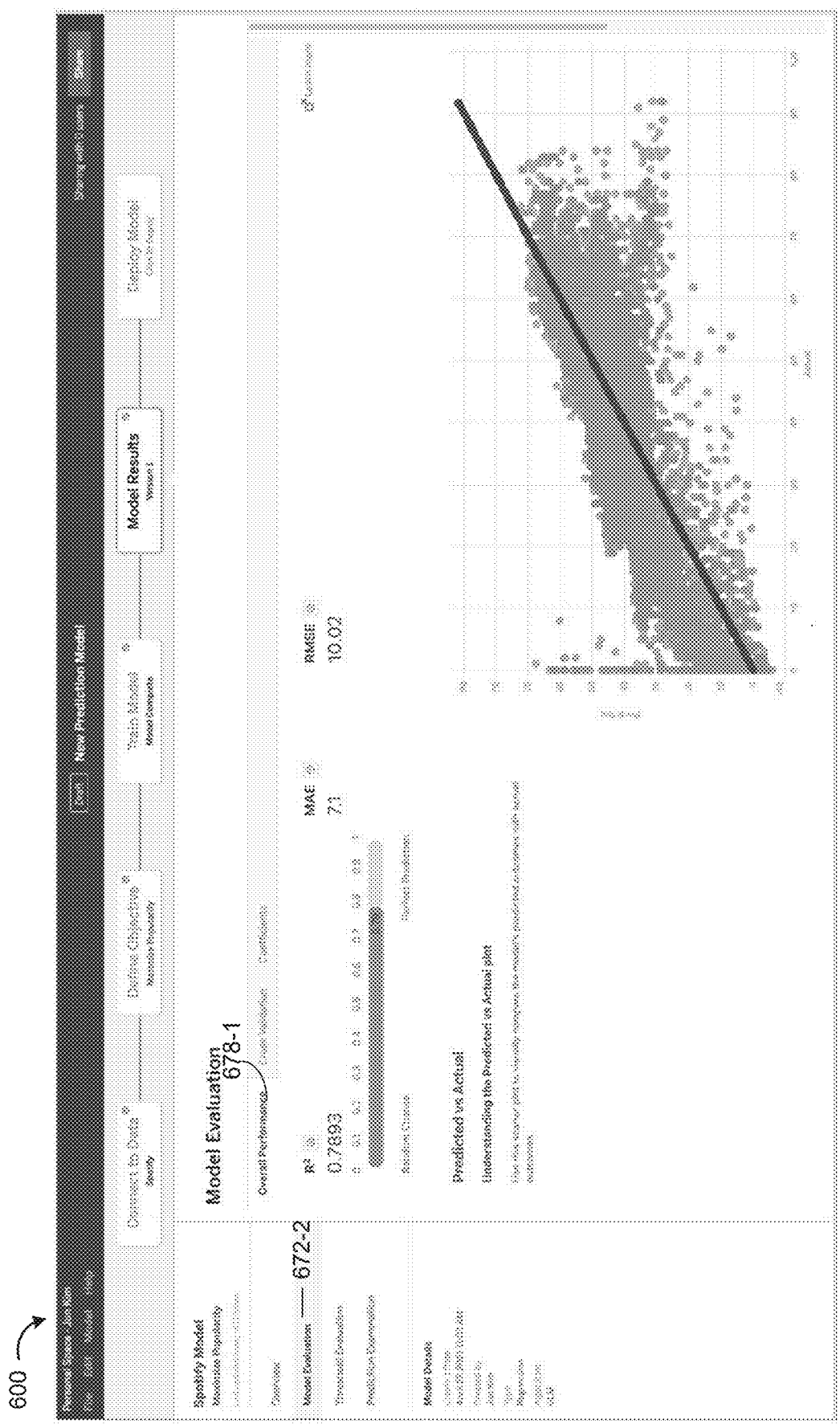
Figure 6S:
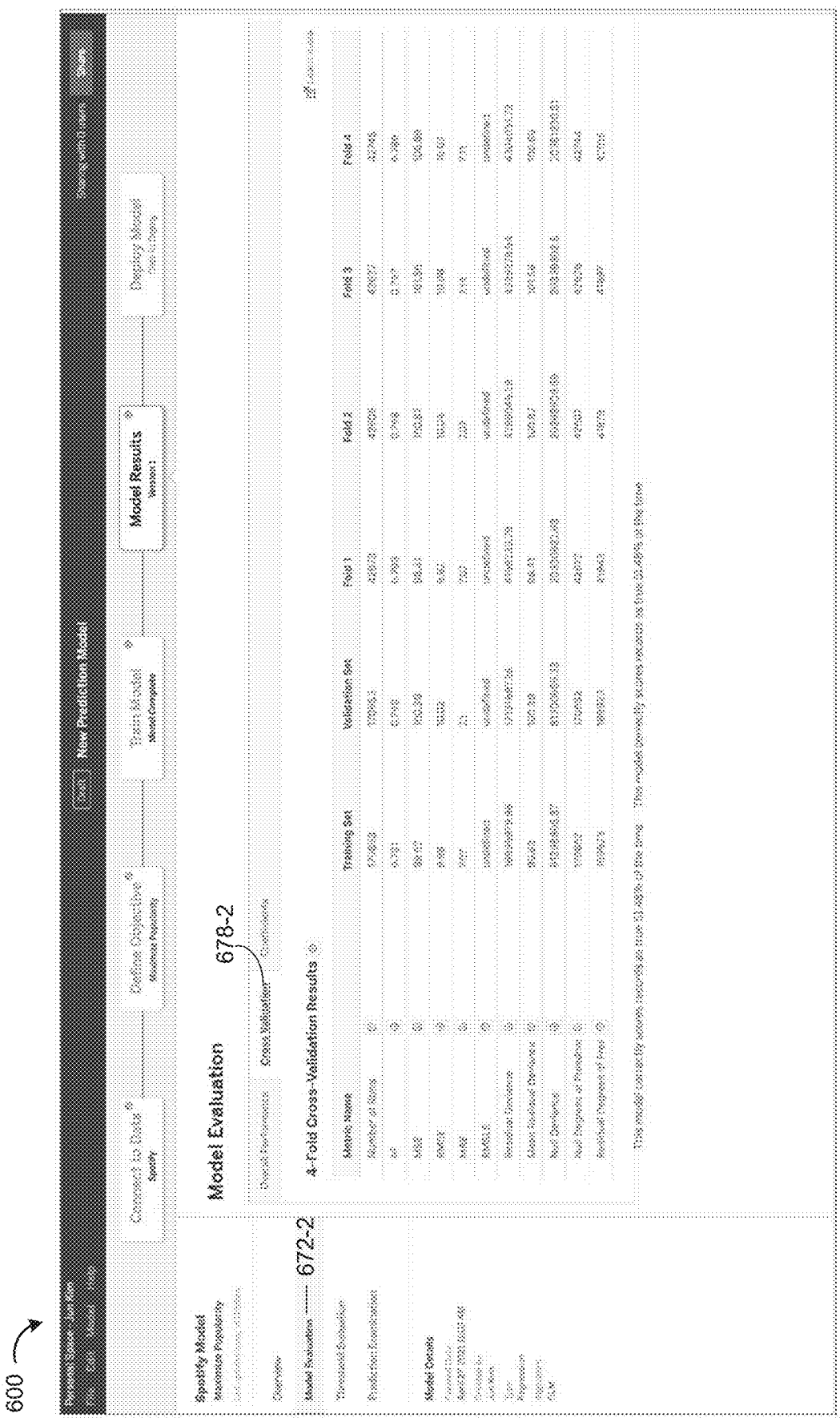
Figure 6T:

In some implementations, each of the model metrics 672 is a user-selectable affordance. For example, FIG. 6Q illustrates in response to user selection of the first metric 672-1 "Overview," the graphical user interface 600 displays an at-a-glance summary 675 of the model's validation results. FIGS. 6R, 6S, and 6T illustrate in response to user selection of the second metric 672-2 "Model Evaluation," the graphical user interface 600 displays navigation tabs 678 (e.g., a first navigation tab 678-1 "Overall Performance," a second tab 678-2 "Cross Validation," and a third tab 678-3 "Coefficients), which, when selected by the user, cause respective information (e.g., parameters) about the model evaluation metric to be displayed.

Figure 6U:
Figure 6V:
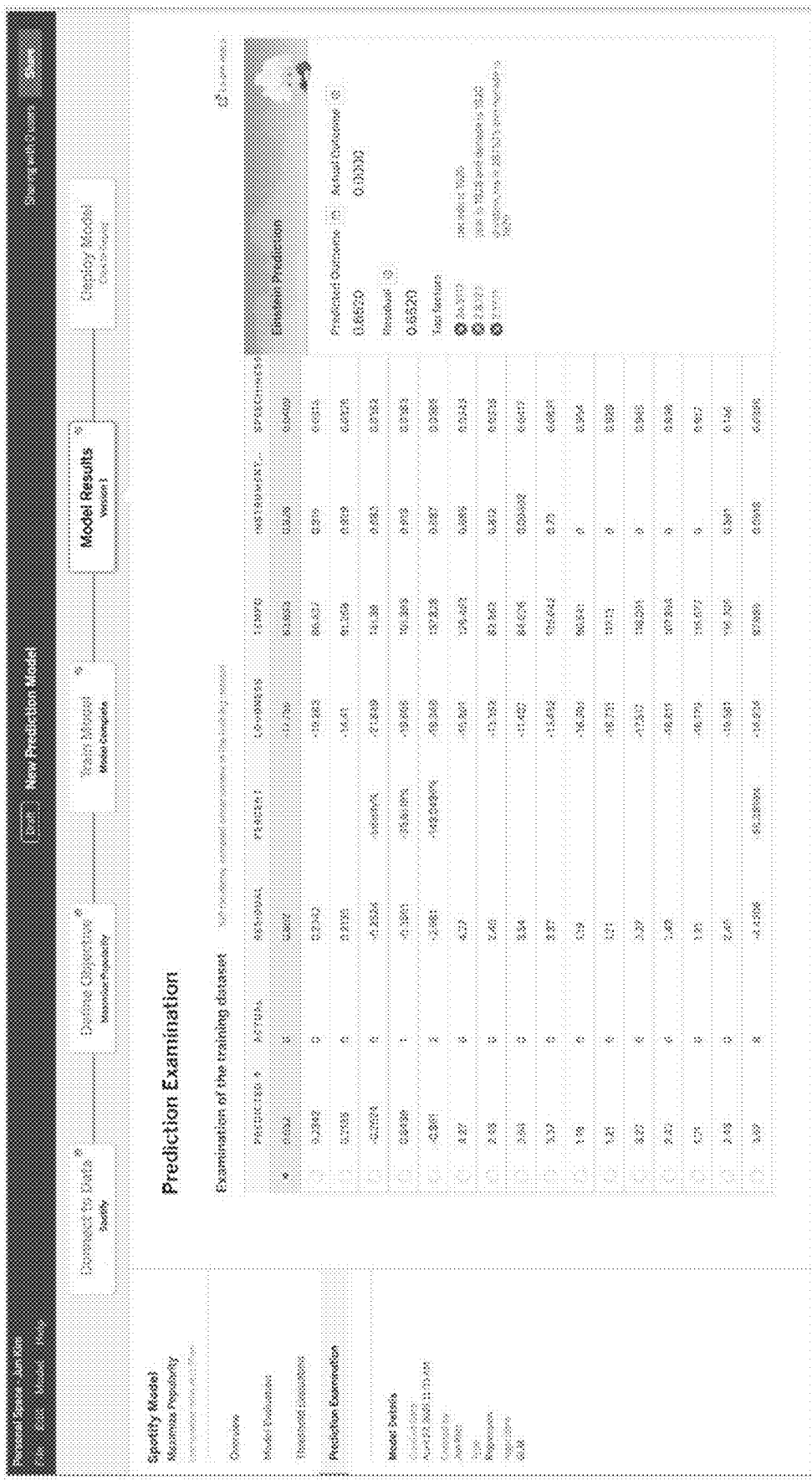

FIGS. 6U and 6V illustrate selection of the third metric 672-3 and the fourth metric 672-4.

Figure 6W:
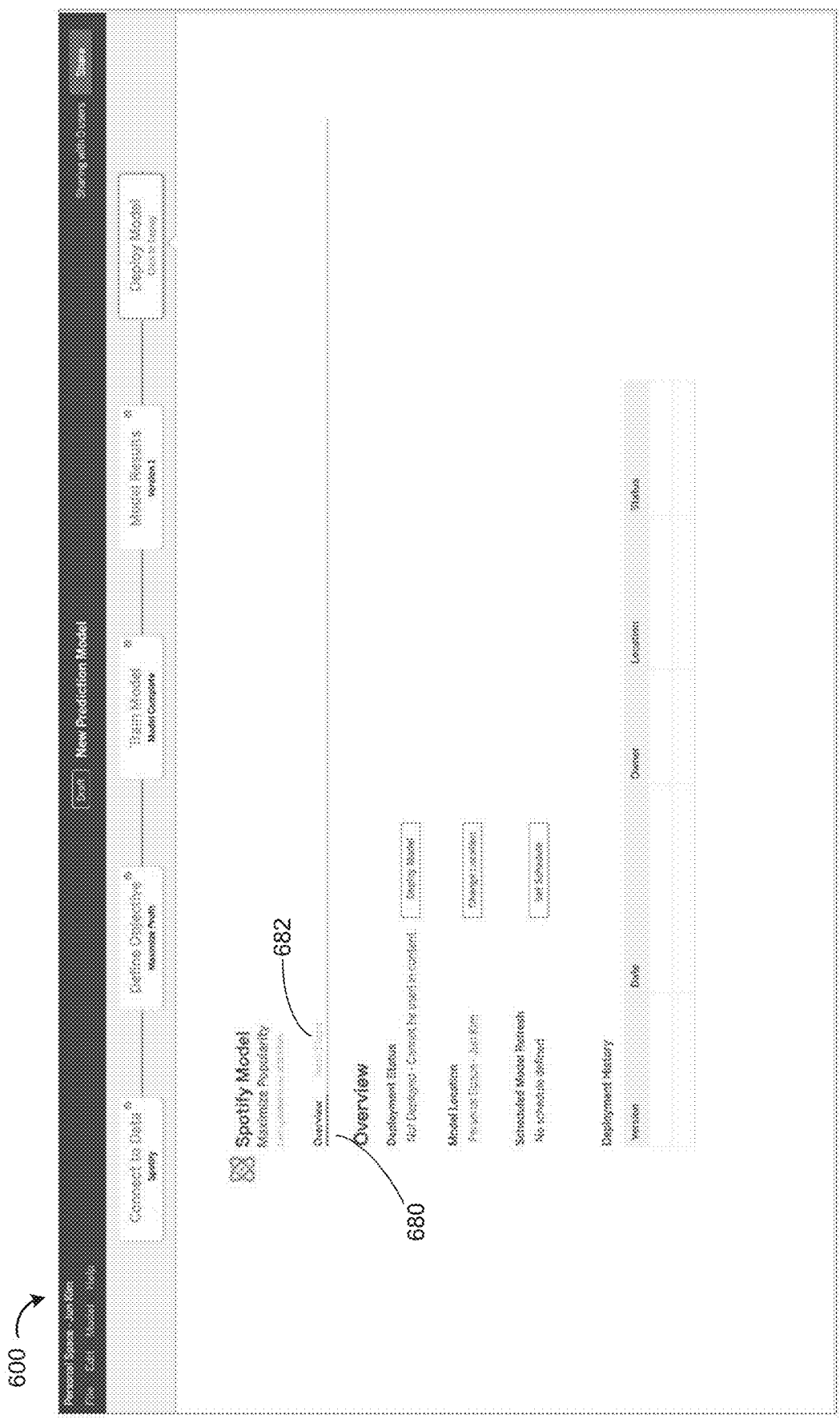

FIGS. 6W to 6AA illustrate model deployment in accordance with some implementations. This corresponds to the "Deploy Model" step 612-5 of the workflow 610. In some implementations, Once the Model is deployed, the "Deploy Model" block 612-5 becomes available (e.g., selectable).

Deploying a model means using the model that has been trained to make new predictions. In some implementations, deploying the model comprises taking the trained model (e.g., which exists in the second server 420, such as in the Einstein Discovery module 414) and enabling it to start generating predictions.

Selecting "Deploy Model" activates the already trained model object and instantiates the API endpoints that allow it to be called for training. Stated another way, deploying a model enables it to start generating predictions as an API endpoint (e.g., the third API 338-3) in a server, such as the third server 430 (e.g., Tableau server), a Salesforce server, or other servers. Predictions can be consumed in data and visualizations, tracked for performance and data drift, and integrated into the data catalog all inside the data visualization server (e.g., the third server 430, Tableau server).

In some implementations, once the model is trained, the trained model is stored as an immutable object in the cloud (e.g., on a server system such as the ML platform) (E.g., the server 300 or the second server 420). The trained model can be deleted. In some implementations, if the user re-runs the training flow, a new object is created, but since this is remote from where the user is running the training user interface (e.g., graphical user interface 600), the model itself is not stored locally in memory.

In some implementations, for the "Deploy Model" step of the workflow, the graphical user interface 600 displays an "Overview" tab 680 and a "Next Steps" tab 682.

Figure 6X:
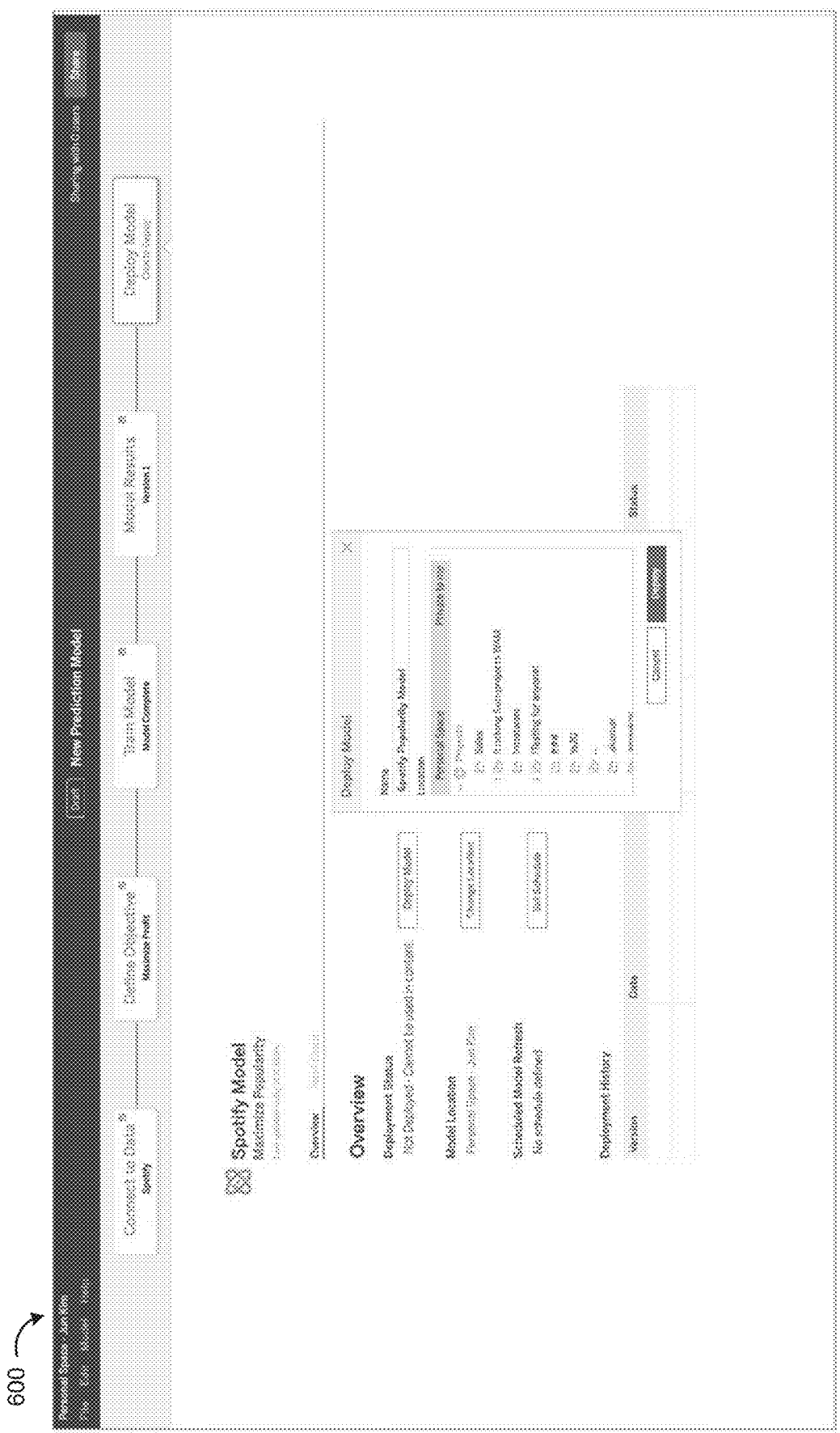
Figure 6Y:
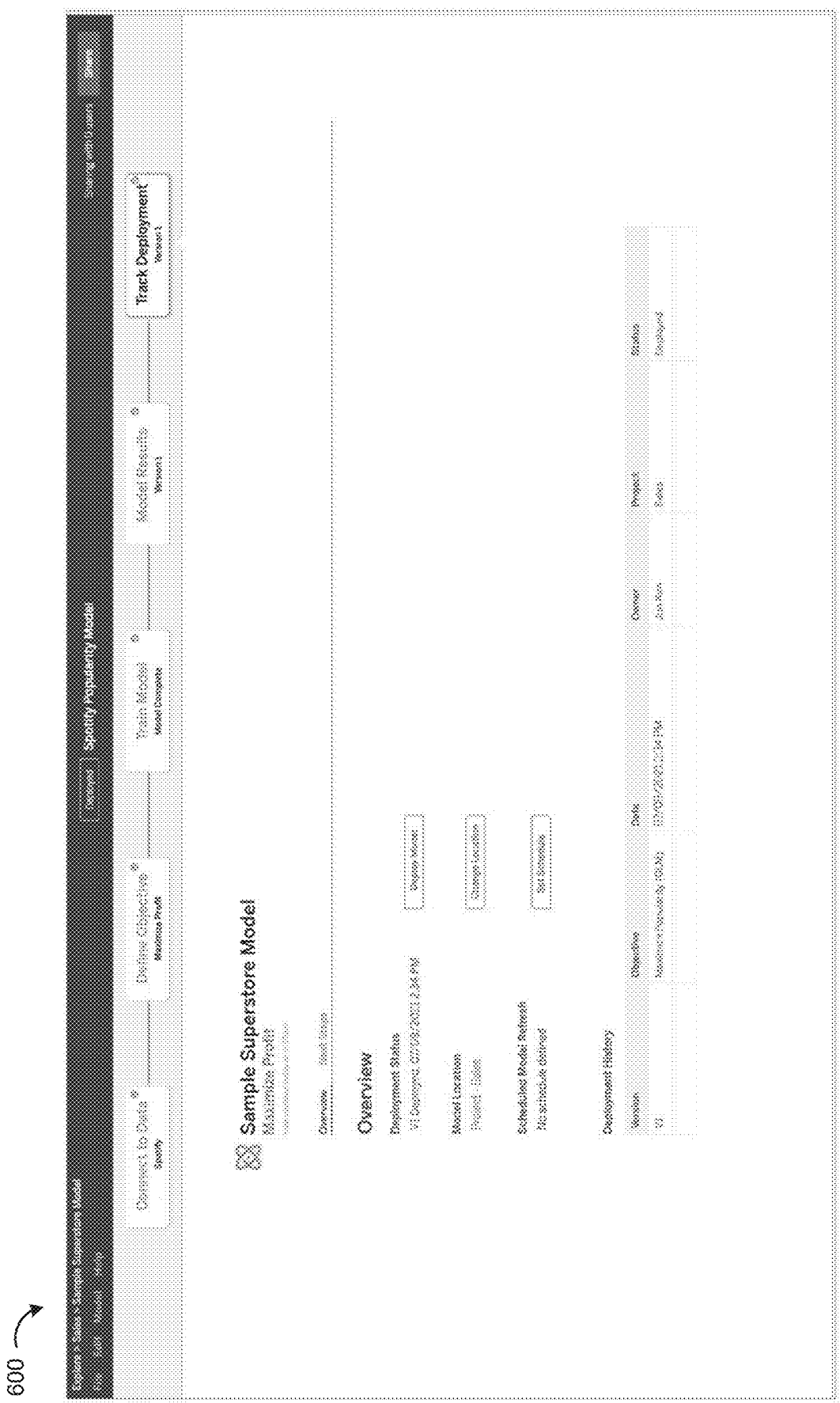

In some implementations, in response to user selection of the "Overview" tab, the graphical user interface 600 displays information such as a deployment status of the location, a location of the model, a deployment history, as illustrated in FIGS. 6W, 6X, and 6Y. In some implementations, the graphical user interface 600 displays a lineage tree to track where the model is being used. For example, the lineage tree can identify Sheets (e.g., worksheets), Dashboards, Calcs, and other files where the model is used.

Figure 6Z:
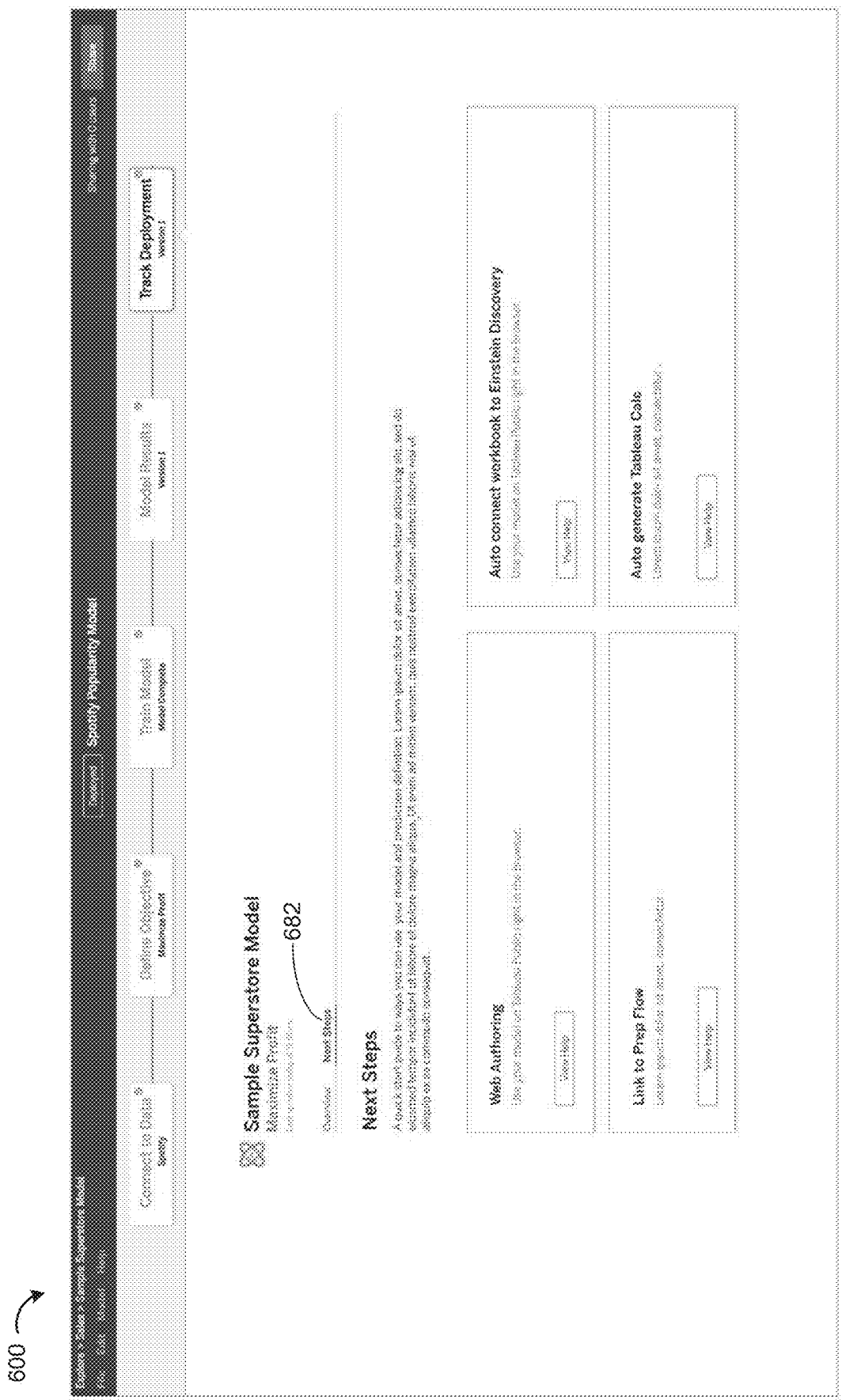
Figure 6A:
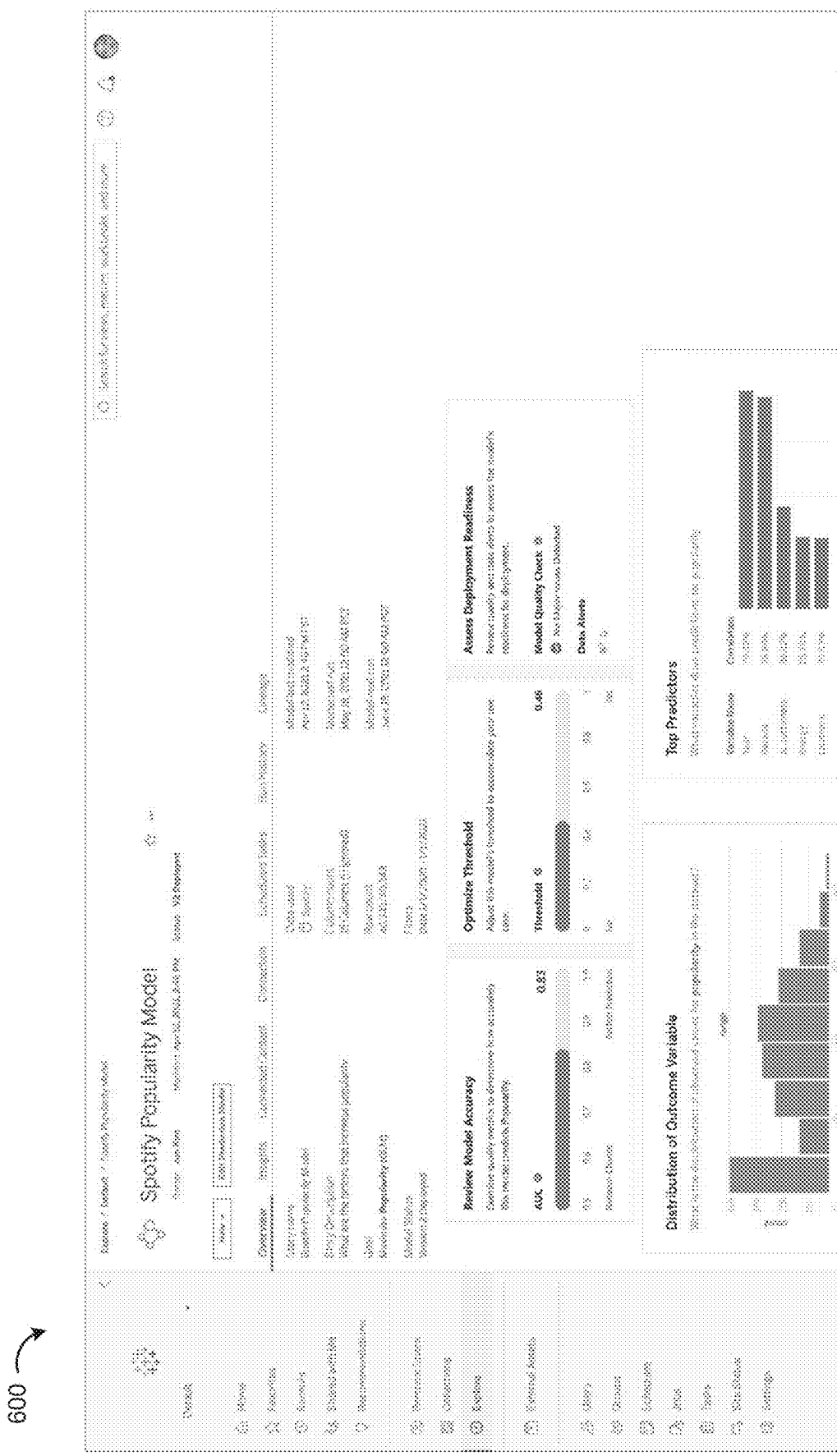
Figure 7A:
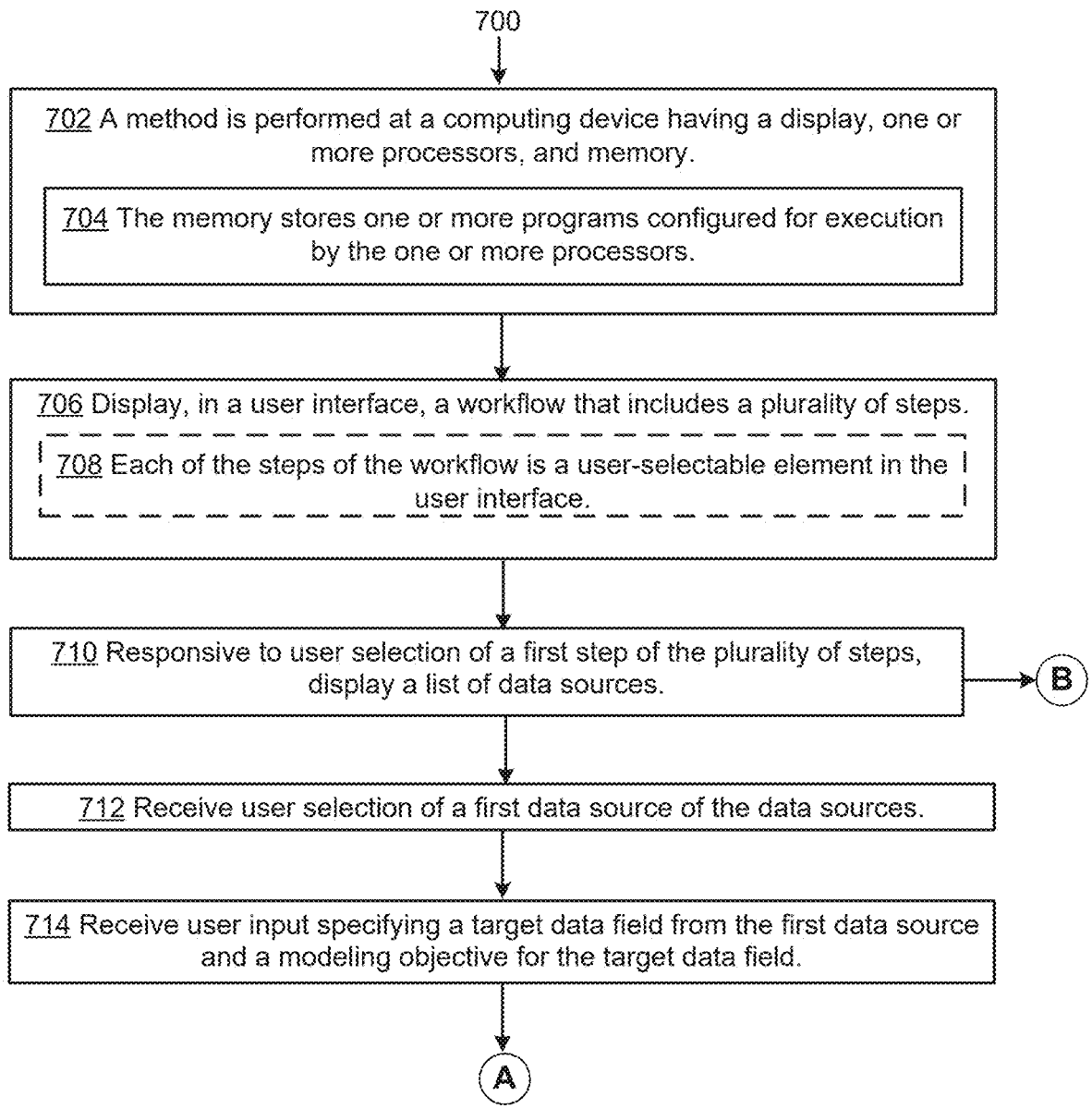
FIGS. 7A-7D provide a flowchart of a method performed at a computing device according to some implementations.
Figure 7B:
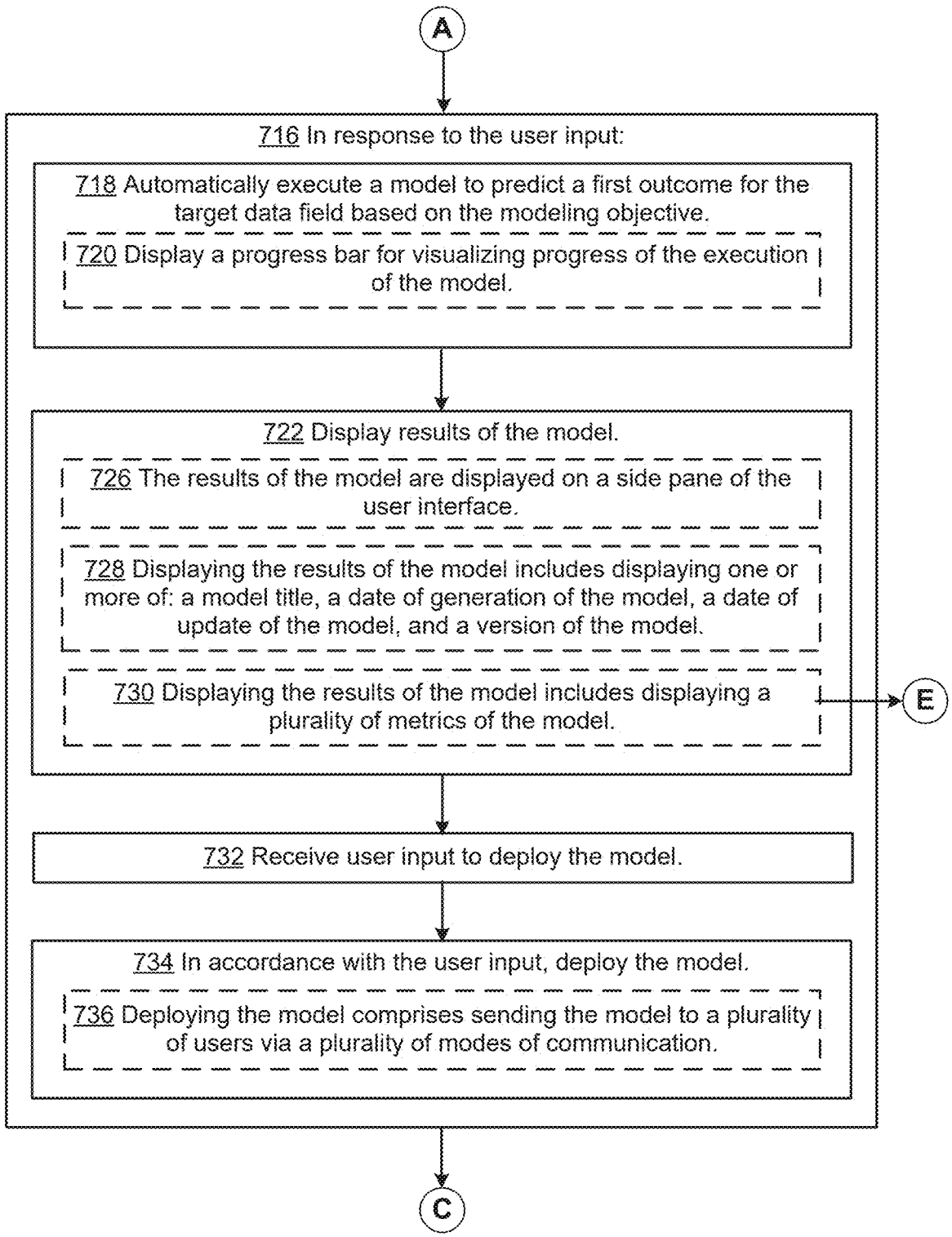
Figure 7C:
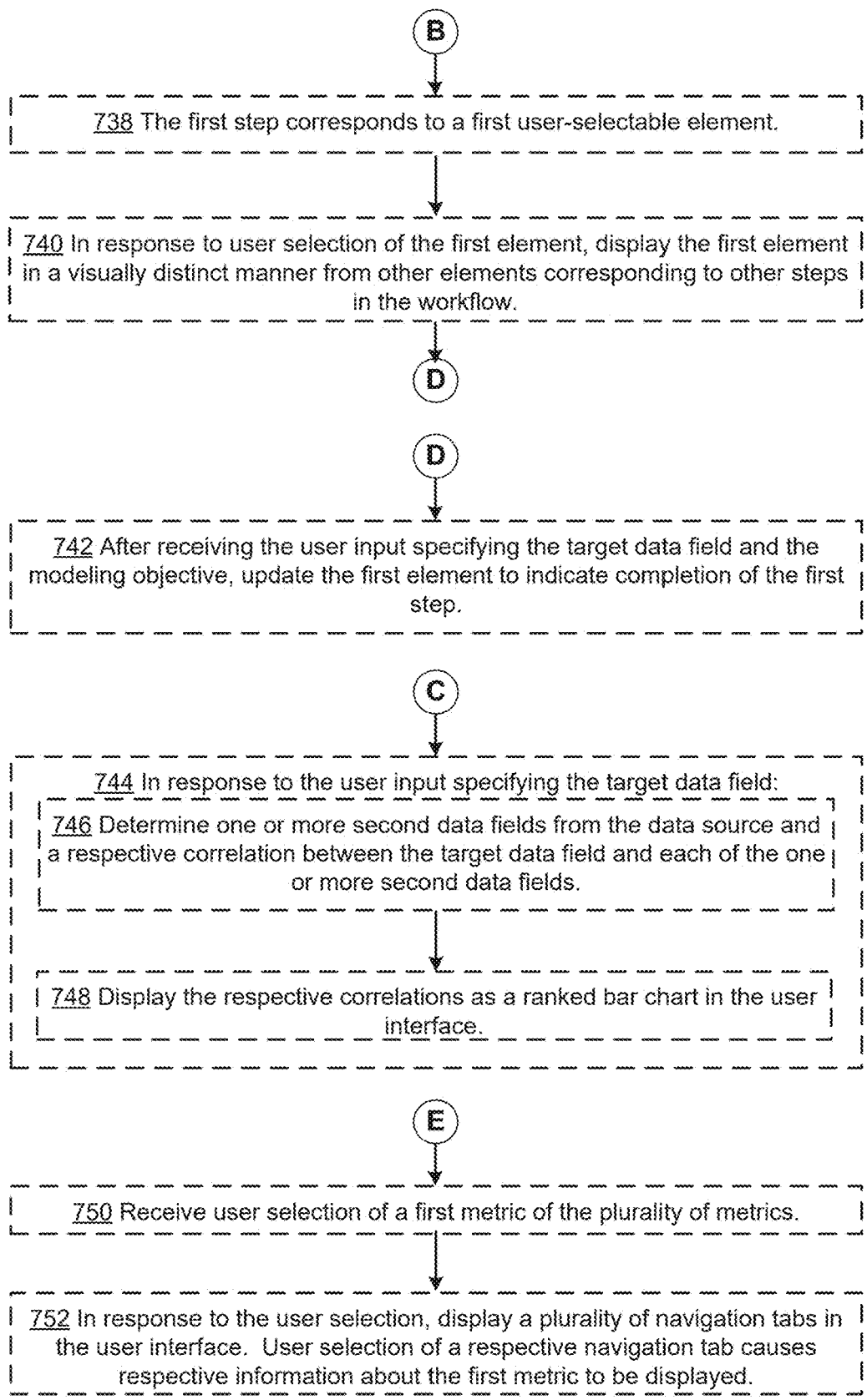
Figure 7D:
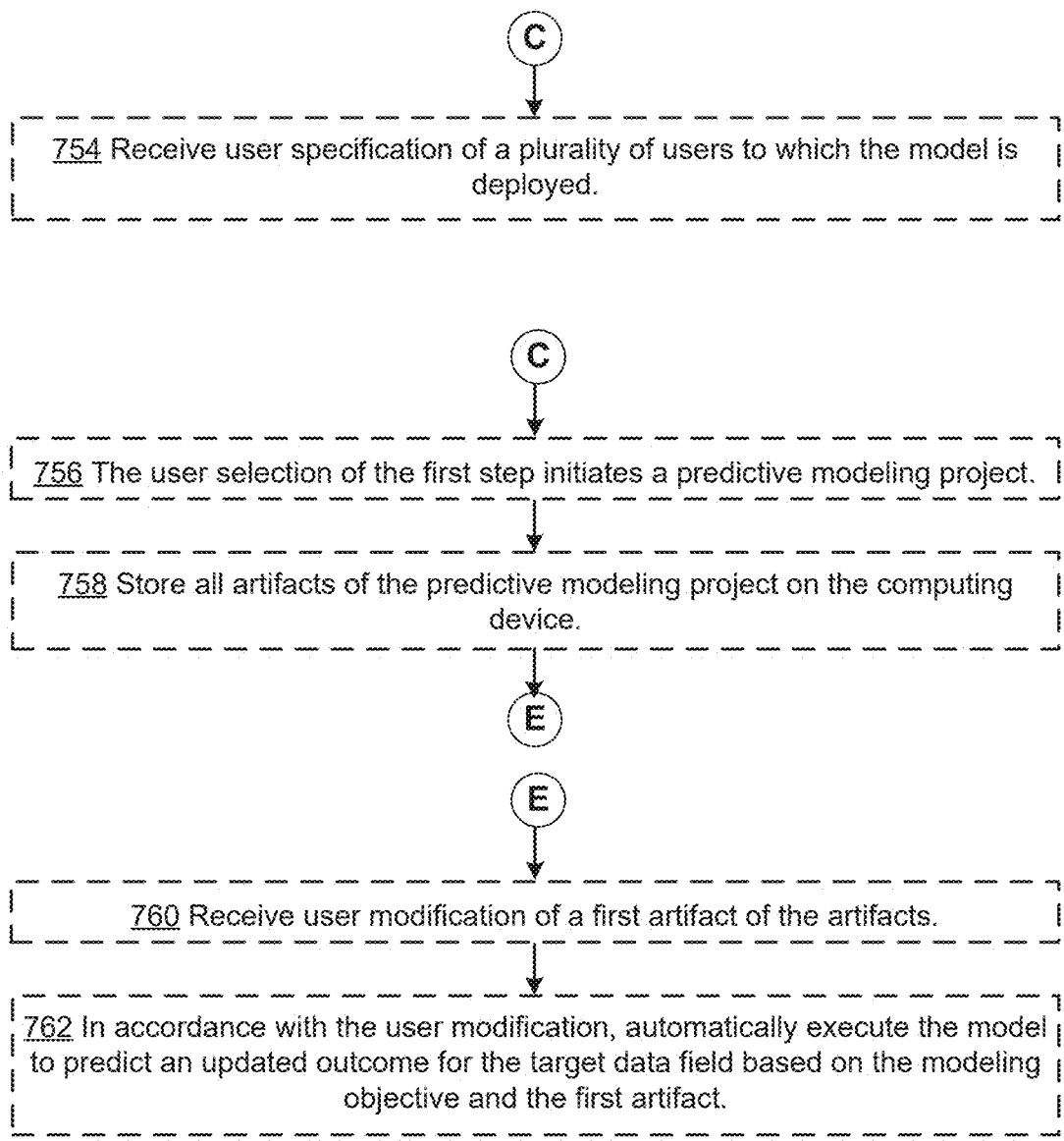

In some implementations, in response to user selection of the "Next Steps" tab 682, the graphical user interface 600 includes a Quick Start guide with instructions on how the new model can be used. These may include Web Authoring, Links to Prep Flow, Auto connect to workbooks in Einstein Discovery, Autogenerating Tableau calcs, and other helpful guides. This is illustrated in FIGS. 6Z and 6AA.

In some implementations, the models are created in, physically stored in, and generate predictions from the second server 420 (e.g., the Tableau CRM server), but will appear in the Tableau server (e.g., the third server 430) as a new object type and is fully supported in the Tableau Catalog. The model itself lives in the Tableau server as a part of its modeling project, which contains all model training steps as well as tracking for observation of the model in production. In some implementations, data from the modeling projects are saved as standalone data, or are tied to existing published data sources. Because the models in the Tableau catalog are connected to the data sources that were used to train them, all modeling decisions and data lineage can be tracked and audited (e.g., traceable). In some implementations, the catalog also tracks where models are being consumed in Prep flows and workbooks. Any user with access to the modeling project can return after the model is in production to audit the project and review data and model choices and assumptions.

In some implementations, during the execution of the workflow 610, the computing device (e.g., and/or the server system 300, 410, 420, or 430) determines artifacts corresponding to each of the steps of the workflow 610. As used herein, an "artifact" refers an item generated and exchanged by human or machine actions across an end-to-end automated data science (ML) workflow that comprises preparation, analysis, deployment, and communication stages (e.g., the steps as discussed with respect to FIG. 6B). For example, the model, the descriptive statistics about the model performance, correlations between the target data field and other data fields of the data source, data changes that are made (e.g., removal of one or more data columns from the data source, filtering data rows, etc.) are artifacts generated in the predictive modeling project. In some implementations, the computing device 200 (e.g., and/or the server system 300, 410, 420, or 430) stores all the artifacts of a predictive modeling project in a single location (e.g., on the computing device or the server system), enabling a user can easily review (e.g., audit) model decisions and understand how data drove the model as a whole and contributed to individual predictions.

In some implementations, the computing device 200 (or the second server system 420) generates one or more views for visualizing artifact interactions across the ML workflow (e.g., a data analysis workflow pipeline). Details of visualizing artifact interactions are disclosed in U.S. Provisional Patent Application No. 63/242,012, filed Sep. 8, 2021, entitled "Visual Tracing and Editing of Machine Learning Models," which is incorporated by reference herein in its entirety.

Thus, in accordance with some implementations, the disclosed systems and user interfaces align with the design principles of integrated, iterative, traceable, guided, collaborative, and fluid (e.g., liquid) ML workflows.

Flowcharts

FIGS. 7A-7D provide a flowchart of a method 700 for generating predictive analytics based on no-code machine learning (ML) models according to some implementations. The method 700 is also called a process.

The method 700 is performed (702) at a computing device 200 that has a display 208, one or more processors (e.g., CPU(s)) 202, and memory 214. The memory 214 stores (704) one or more programs configured for execution by the one or more processors 202. In some implementations, the operations shown in FIGS. 5A to 5B and FIGS. 6A to 6AA correspond to instructions stored in the memory 214 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 700 may be combined and/or the order of some operations may be changed.

The computing device 200 displays (706), in a user interface (e.g., graphical user interface 600), a workflow (e.g., a workflow interface or a workflow pipeline) (e.g., the workflow 610 as illustrated in FIGS. 6B, 6D, and 6F), which includes a plurality of steps (e.g., the steps of the workflow are represented as blocks 612). In some implementations, the plurality of steps can include steps such as "connect to data" (e.g., select a data source)," "objective definition" (e.g., define a modeling objective for a target data field of a selected data source," "model training (e.g., model generation, model optimization), "display model results," and "deploy model." In some implementations, alternative names of steps are used to specify the same or equivalent functions.

In some implementations, each of the steps of the workflow is (708) a user-selectable element in the user interface.

Responsive to user selection of a first step (e.g., "Connect to Data") of the plurality of steps, the computing device displays (710) a list of data sources (e.g., the data sources 240).

The computing device 200 receives (712) user selection of a first data source (or dataset) of the data sources (e.g., the "Spotify" data source, as illustrated in FIG. 6E).

In some implementations, after receiving user selection of the data source, the computing device 200 receives further user input to clean up/prep the data. For example, the user can specify filters to filter data fields of the data source to a subset of data fields, or filter data values of one or more data fields of the data source to a subset of data values, which will be used for model training.

The computing device 200 receives (714) user input specifying a target data field (e.g., a target variable, an outcome variable, or an outcome field) from the first data source (e.g., the data field 658 "Popularity" as illustrated in FIG. 60, or any data field in the data source, such as "Tempo," "Release Date," "Sales," or "Profit") and a modeling objective (e.g., modeling goal) for the target data field (e.g., maximize, minimize, increase, decrease, or classify the target field).

In response to (716) the user input, the computing device 200 automatically executes (718) (e.g., generates or trains) (e.g., without user intervention) a model (e.g., a predictive model) to predict a first outcome for the target data field based on the modeling objective. For example, in some implementations, the model optimizes the modeling objective for the target data field. In some implementations, automatically executing the model includes computing statistics for evaluating performance of the model.

The computing device displays (722) results of the model.

In some implementations, the results of the model are displayed (726) on a side pane of the user interface (e.g., a side pane 676 of the interface 600, as illustrated in FIG. 6Q).

In some implementations, displaying the results of the model includes displaying (728) one or more of: a model title, a date of generation of the model, a date of update of the model, and a version of the model.

In some implementations, the computing device 200 also displays an affordance (e.g., a user-selectable element) to deploy the model.

In some implementations, displaying the results of the model includes (730) displaying a plurality of metrics of the model (e.g., metrics 672 such as "Overview," "Model Evaluation," "Threshold Evaluation," and/or "Prediction Evaluation", as illustrated in FIG. 6Q).

The computing device 200 receives (732) user input to deploy the model.

In accordance with the user input, the computing device 200 deploys (734) the model.

For example, deploying the model can includes using the trained model to make new predictions. In some implementations, deploying the model comprises taking the trained model (e.g., that exists in the server 420 (e.g., in the Einstein Discovery module 414) and enabling it to start generating predictions as an API endpoint (e.g., the third API 338-3) in a server such as the third server 430 (e.g., Tableau server), a Salesforce server, or other servers.

In some implementations, once a model is trained, the trained model is stored as an immutable object in the cloud (e.g., on a server system). The trained model can be deleted, and if the user re-runs the training flow, a new object is created. Because the trained model is located remotely from where the user is running the training user interface, the model itself is not stored locally in memory.

In some implementations, all information about the model that is shown in the graphical user interface 600 is derived from data that is transmitted back to the Prometheus Microservice 402 (e.g., the authoring UI 402 or the graphical user interface 600) from the second server 420, which houses the Einstein Discovery module 414. Selecting "Deploy Model" activates the already trained model object and instantiates the API endpoints that allow it to be called for training.

In some implementations, deploying the model comprises sending (736) the model to a plurality of users via a plurality of modes of communication (e.g., by instant messaging, by Slack channels, by email, via a messaging application, or via a data visualization application).

In some implementations, the first step (e.g., step 612-1) corresponds (738) to a first user-selectable element. In response to user selection of the first element, the computing device 200 displays (740) the first element in a visually distinct manner from other elements corresponding to other steps in the workflow. For example, in some implementations, at the start of the modeling project, each of the steps (e.g., the blocks 612) is grayed out (inactive) in the graphical user interface 600. Execution of a particular step causes that step to be visually emphasized (e.g., activated) in the graphical user interface 600. In some implementations, while the workflow steps are displayed in a linear manner, as illustrated in FIG. 6B, a user can elect to execute certain steps while bypassing other steps of the workflow 610.

In some implementations, after receiving the user input specifying the target data field and the modeling objective, the computing device 200 updates (742) the first element to indicate completion of the first step (e.g., by adding a checkmark (e.g., a green checkmark) in the block 612 corresponding to the first element).

In some implementations, in response to (744) the user input specifying the target data field, the computing device 200 determines (746) one or more second data fields from the data source and a respective correlation between the target data field and each of the one or more second data fields. The computing device 200 displays (748) the respective correlations as a ranked bar chart on the user interface. This is illustrated in FIG. 60.

In some implementations, the computing device 200 receives (750) user selection of a first metric 672 of the plurality of metrics. In response to the user selection, the computing device displays (752) a plurality of navigation tabs 678 on the user interface. User selection of a respective navigation tab causes respective information (e.g., parameters) about the first metric to be displayed.

In some implementations, the computing device 200 displays (720) a progress bar (e.g., progress bar 666) for visualizing progress (e.g., real-time progress) of the model generation. In some implementations, the progress bar includes information such as time elapsed, percentage completed, identification of stages of the model generation, and possible errors encountered.

In some implementations, the computing device 200 receives (754) user specification of a plurality of users to which the model is to be deployed. In some implementations, the user specification includes a respective level of access (e.g., rights to edit the model, view the model only, and/or re-share the model with other users)

In some implementations, the user selection of the first step initiates (756) a predictive modeling project. The computing device 200 stores (758) all artifacts of the predictive modeling project on the computing device. In some implementations, the artifacts are stored on a server system (e.g., server 300, 410, 420, and/or 430), which is communicatively connected with the computing device.

In some implementations, the computing device 200 receives (760) user modification of a first artifact of the artifacts. In accordance with the user modification, the computing device 200 automatically executes (762) (e.g., iterates) the model to predict an updated outcome for the target data field based on the modeling objective and the first artifact. In some implementations, the computing device 200 (or the server 300, 420, or 430) associates every iteration of the model with a corresponding version number for the model and/or a date/time stamp. The computing device 200 (or the server 300, 420, or 430) further stores all artifacts corresponding to that version number, thereby providing an auditable trail for all data and modeling choices.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating predictive analytics based on no-code machine learning (ML) models, comprising:
    at a computing device having a display, one or more processors, and memory storing one or more programs configured for execution by the one or more processors, including instructions to perform:
        displaying, in a user interface, a workflow that includes a plurality of steps of the workflow; and
        responsive to receiving user selection, via the user interface, of a first step of the plurality of steps, initiating a predictive modeling project, including:
            displaying, in the user interface, a list of data sources;
            receiving, via the user interface, user selection of a first data source of the data sources;
            receiving, via the user interface, first user input specifying a target data field from the first data source and a modeling objective for the target data field;
        in response to receiving the first user input specifying the target data field and the modeling objective for the target data field:
            determining, by the computing device without user input, (i) one or more data fields from the data source and (ii) a respective correlation between the target data field and each of the one or more data fields, and displaying the one or more data fields in the user interface;
        receiving, via the user interface, second user input (a) selecting at least one of the one or more data fields to include in the predictive modeling project or (b) deselecting at least one of the one or more data fields to exclude from the predictive modeling project;
        in accordance with receiving the second user input:
            automatically executing a model to predict a first outcome for the target data field based on the modeling objective;
            while automatically executing the model, obtaining a plurality of artifacts for the predictive modeling project, wherein a respective artifact of the plurality of artifacts is an item generated and exchanged by human or machine actions across an end-to-end automated ML workflow that comprises preparation, analysis, deployment, and communication stages;
            generating and displaying results of the model in the user interface, including generating and displaying an artifact dependency view that shows dependency relationships between the plurality of artifacts, including, in response to user interaction in the user interface with a particular artifact displayed in the artifact dependency view, highlighting in the user interface the associated dependencies of the particular artifact, wherein:
                the artifact dependency view includes (i) a plurality of visual representations corresponding to the plurality of artifacts and (ii) a plurality of connectors, wherein a respective connector of the plurality of connectors connects two visual representations of the plurality of visual representations, corresponding to two artifacts of the plurality of artifacts that have a dependency relationship with each other; and
                the plurality of visual representations includes a first visual representation corresponding to a human-generated artifact, a second visual representation corresponding to a machine-generated artifact, and a third visual representation corresponding to an artifact with a missing source, wherein displaying the artifact dependency view includes displaying the first visual representation, the second visual representation, and the third visual representation with different visual characteristics;
        updating a metadata database of a server to include the plurality of artifacts;
        receiving, via the user interface, third user input to deploy the model to a plurality of subjects; and
        in accordance with receiving the third user input, deploying the model to a plurality of devices associated with the plurality of subjects via a communication interface of the computing device, the plurality of devices including a first device executing a messaging application and a second device executing a data visualization application.

2. The method of claim 1, wherein each of the plurality of steps of the workflow is a user-selectable element in the user interface.

3. The method of claim 2, wherein the first step of the workflow corresponds to a first user-selectable element, the method further comprising:
in response to user selection of the first user-selectable element corresponding to the first step of the workflow, displaying the first user-selectable element in a visually distinct manner from other user-selectable elements corresponding to other steps of the plurality of steps of the workflow.

4. The method of claim 3, further comprising:
after receiving the first user input specifying the target data field and the modeling objective, updating the first user-selectable element to indicate completion of the first step of the workflow.

5. The method of claim 1, wherein the results of the model are displayed on a side pane of the user interface.

6. The method of claim 1, wherein displaying the results of the model includes displaying one or more of: a model title, a date of generation of the model, a date of update of the model, and a version of the model.

7. The method of claim 1, wherein:
displaying the results of the model includes displaying a plurality of metrics of the model; and
the method further comprises:
receiving user selection of a first metric of the plurality of metrics; and
in response to the user selection of the first metric of the plurality of metrics, displaying a plurality of navigation tabs in the user interface, wherein user selection of a respective navigation tab causes respective information about the first metric to be displayed.

8. The method of claim 1, further comprising:
displaying a progress bar for visualizing progress of the model execution.

9. The method of claim 1, further comprising receiving user specification of a plurality of users to which the model is to be deployed.

10. The method of claim 1, further comprising:
storing all artifacts generated from the predictive modeling project on the computing device.

11. The method of claim 10, further comprising:
receiving user modification of a first artifact of the artifacts; and
in accordance with the user modification, automatically executing the model to predict an updated outcome for the target data field based on the modeling objective and the first artifact.

12. The method of claim 1, wherein deploying the model comprises sending the model to a plurality of users via a plurality of modes of communication.

13. The method of claim 1, further comprising:
after determining the respective correlation between the target data field and each of the one or more data fields:
displaying the respective correlation as a ranked bar chart in the user interface, wherein the ranked bar chart includes a plurality of each of the data bars, each of the data bars corresponding to a field name of a respective data field of the one or more data fields; and receiving the second user input includes receiving user selection or deselection, from the ranked bar chart, of at least one data bar corresponding to the respective data field of the one or more data fields.

14. The method of claim 1, further comprising storing the plurality of artifacts on the server.

15. The method of claim 1, wherein generating and displaying the results of the model in the user interface includes:
generating and displaying an artifact origin view that identifies a first subset of the plurality of artifacts that are human-generated and a second subset of the plurality of artifacts, distinct from the first subset of the plurality of artifacts, that are machine-generated; and
the artifact origin view comprises an alluvial diagram having a first end, a second end, and a plurality of first connectors, the first end including a plurality of second visual representations that identifies a human-generated source or a machine-generated source, the second end includes a plurality of third visual representations that each corresponds to a respective artifact of the plurality of artifacts, and a respective connector connects a respective second visual representation to a respective third visual representation.

16. The method of claim 1, wherein generating and displaying the artifact dependency view includes:
in response to receiving a user interaction with a respective visual representation, corresponding to a respective artifact of the plurality of artifacts, in the artifact dependency view:
displaying an information window that includes information about the respective artifact.

17. A computing device for generating predictive analytics based on no-code machine learning (ML) models, comprising:
a display;
one or more processors; and
memory coupled to the one or more processors, the memory storing one or more programs configured to be executed by the one or more processors, the one or more programs including instructions for:
displaying, in a user interface, a workflow that includes a plurality of steps; and
responsive to receiving user selection, via the user interface, of a first step of the plurality of steps, initiating a predictive modeling project, including:
displaying, in the user interface, a list of data sources;
receiving, via the user interface, user selection of a first data source of the data sources;
receiving, via the user interface, first user input specifying a target data field from the first data source and a modeling objective for the target data field;
in response to receiving the first user input specifying the target data field and the modeling objective for the target data field:
determining, by the computing device without user input, (i) one or more data fields from the data source and (ii) a respective correlation between the target data field and each of the one or more data fields, and displaying the one or more data fields in the user interface;
receiving, via the user interface, second user input (a) selecting at least one of the one or more data fields to include in the predictive modeling project or (b) deselecting at least one of the one or more data fields to exclude from the predictive modeling project;

in accordance with receiving the second user input:
automatically executing a model to predict a first outcome for the target data field based on the modeling objective;
while automatically executing the model, obtaining a plurality of artifacts for the predictive modeling project, wherein a respective artifact of the plurality of artifacts is an item generated and exchanged by human or machine actions across an end-to-end automated ML workflow that comprises preparation, analysis, deployment, and communication stages;
generating and displaying results of the model in the user interface, including generating and displaying an artifact dependency view that shows dependency relationships between the plurality of artifacts, including, in response to user interaction in the user interface with a particular artifact displayed in the artifact dependency view, highlighting in the user interface the associated dependencies of the particular artifact, wherein:
the artifact dependency view includes (i) a plurality of visual representations corresponding to the plurality of artifacts and (ii) a plurality of connectors, wherein a respective connector of the plurality of connectors connects two visual representations of the plurality of visual representations, corresponding to two artifacts of the plurality of artifacts that have a dependency relationship with each other; and
the plurality of visual representations includes a first visual representation corresponding to a human-generated artifact, a second visual representation corresponding to a machine-generated artifact, and a third visual representation corresponding to an artifact with a missing source, wherein displaying the artifact dependency view includes displaying the first visual representation, the second visual representation, and the third visual representation with different visual characteristics;
updating a metadata database of a server to include the plurality of artifacts;
receiving, via the user interface, third user input to deploy the model to a plurality of subjects; and
in accordance with the third user input, deploying the model to a plurality of devices associated with the plurality of subjects via a communication interface of the computing device, the plurality of devices including a first device executing a messaging application and a second device executing a data visualization application.

18. The computing device of claim 17, wherein the first step included in the workflow corresponds to a first user-selectable element in the user interface, and the one or more programs further include instructions for:
in response to user selection of the first user-selectable element corresponding to the first step included in the workflow, displaying the first user-selectable element in a visually distinct manner from other user-selectable elements corresponding to other steps of the plurality of steps of the workflow.

19. The computing device of claim 18, wherein the one or more programs further include instructions for:
after receiving the first user input specifying the target data field and the modeling objective, updating the first user-selectable element to indicate completion of the first step included in the workflow.

20. A non-transitory computer-readable storage medium storing one or more programs, the one or more programs comprising instructions, which when executed by a computing device, cause the computing device to perform operations comprising:
displaying, in a user interface, a workflow that includes a plurality of steps; and
responsive to receiving user selection, via the user interface, of a first step of the plurality of steps, initiating a predictive modeling project, including:
displaying, in the user interface a list of data sources;
receiving, via the user interface, user selection of a first data source of the data sources;
receiving, via the user interface, first user input specifying a target data field from the first data source and a modeling objective for the target data field;
in response to receiving the first user input specifying the target data field and the modeling objective for the target data field:
determining, by the computing device without user input, (i) one or more data fields from the data source and (ii) a respective correlation between the target data field and each of the one or more data fields, and displaying the one or more data fields in the user interface;
receiving, via the user interface, second user input (a) selecting at least one of the one or more data fields to include in the predictive modeling project or (b) deselecting at least one of the one or more data fields to exclude from the predictive modeling project;
in accordance with receiving the second user input:
automatically executing a model to predict a first outcome for the target data field based on the modeling objective;
while automatically executing the model, obtaining a plurality of artifacts for the predictive modeling project, wherein a respective artifact of the plurality of artifacts is an item generated and exchanged by human or machine actions across an end-to-end automated ML workflow that comprises preparation, analysis, deployment, and communication stages;
generating and displaying results of the model in the user interface, including generating and displaying an artifact dependency view that shows dependency relationships between the plurality of artifacts, including, in response to user interaction in the user interface with a particular artifact displayed in the artifact dependency view, highlighting in the user interface the associated dependencies of the particular artifact, wherein:
the artifact dependency view includes (i) a plurality of visual representations corresponding to the plurality of artifacts and (ii) a plurality of connectors, wherein a respective connector of the plurality of connectors connects two visual representations of the plurality of visual representations, corresponding to two artifacts of the plurality of artifacts that have a dependency relationship with each other; and the plurality of visual representations includes a first visual representation corresponding to a human-generated artifact, a second visual representation corresponding to a machine-generated artifact, and a third visual representation corresponding to an artifact with a missing source, wherein displaying the artifact dependency view includes displaying the first visual representation, the second visual representation, and the third visual representation with different visual characteristics;

updating a metadata database of a server to include the plurality of artifacts;

receiving, via the user interface, third user input to deploy the model to a plurality of subjects; and in accordance with the third user input, deploying the model to a plurality of devices associated with the plurality of subjects via a communication interface of the computing device, the plurality of devices including a first device executing a messaging application and a second device executing a data visualization application.

\* \* \* \* \*